United States Patent
Ahn et al.

(10) Patent No.: US 10,255,443 B2
(45) Date of Patent: Apr. 9, 2019

(54) METHOD, APPARATUS, SYSTEM AND NON-TRANSITORY COMPUTER READABLE MEDIUM FOR CODE PROTECTION

(71) Applicant: LINE Corporation, Shibuya-ku, Tokyo (JP)

(72) Inventors: Sungbeom Ahn, Seongnam-si (KR); SangHun Jeon, Seongnam-si (KR); Wang Jin Oh, Seongnam-si (KR); Myungju Chung, Seongnam-si (KR); Dongpil Seo, Seongnam-si (KR); Seong Yeol Lim, Seongnam-si (KR); Kwang-Hee Han, Seongnam-si (KR)

(73) Assignee: Line Corporation, Tokyo (JP)

( * ) Notice: Subject to any disclaimer, the term of this patent is extended or adjusted under 35 U.S.C. 154(b) by 225 days.

(21) Appl. No.: 15/429,665

(22) Filed: Feb. 10, 2017

(65) Prior Publication Data
US 2017/0235963 A1 Aug. 17, 2017

(30) Foreign Application Priority Data

Feb. 11, 2016 (KR) .................. 10-2016-0015910
Mar. 8, 2016 (KR) .................. 10-2016-0027824

(51) Int. Cl.
*G06F 11/30* (2006.01)
*G06F 21/60* (2013.01)
(Continued)

(52) U.S. Cl.
CPC .......... *G06F 21/602* (2013.01); *G06F 21/14* (2013.01); *G06F 21/54* (2013.01); *H04L 9/14* (2013.01); *G06F 2221/033* (2013.01)

(58) Field of Classification Search
USPC ........................................... 713/190
See application file for complete search history.

(56) References Cited

U.S. PATENT DOCUMENTS 6,158,005 A * 12/2000 Bharathan ............. G06F 21/121
348/E7.07
7,757,097 B2 * 7/2010 Atallah ............... G06F 12/1408
713/176
(Continued)

FOREIGN PATENT DOCUMENTS

KR 20070067953 A 6/2007
KR 20140029562 A 3/2014
(Continued)

OTHER PUBLICATIONS

Korean Office Action dated Apr. 12, 2017 for corresponding Korean Patent Application No. 10-2016-0015910.
(Continued)

*Primary Examiner* — Amare F Tabor
(74) *Attorney, Agent, or Firm* — Harness, Dickey & Pierce, P.L.C.

(57) ABSTRACT

A code protection method may include storing, using a processor of a computer, a package file that includes files for an application on a storage device of the computer; transforming, at the processor, a protection target method and/or function selected from a file that includes an execution code among the files, or converting or deleting a library file among the files; regenerating the package file by adding, to the package file, a first protection module file for restoring the transformed protection target method and/or function or a second protection module file for restoring the library file; and providing the regenerated package file over a network.

16 Claims, 21 Drawing Sheets

(51) Int. Cl.
*G06F 21/54* (2013.01)
*H04L 9/14* (2006.01)
*G06F 21/14* (2013.01)

(56) References Cited

U.S. PATENT DOCUMENTS

| | | | |
|---|---|---|---|
| 8,250,377 B2* | 8/2012 | Png | G06F 21/10 370/335 |
| 8,819,856 B1* | 8/2014 | Tiffe | G06F 21/125 726/31 |
| 8,826,033 B1* | 9/2014 | Krishnaprasad | G06F 21/554 713/187 |
| 9,171,135 B2* | 10/2015 | Vincent | G06F 21/10 |
| 9,411,976 B2* | 8/2016 | Irvine | G06F 21/6218 |
| 9,471,288 B2* | 10/2016 | Miller | G06F 8/423 |
| 2015/0117641 A1* | 4/2015 | Carrillo De La Fuente | H04L 9/0825 380/44 |
| 2015/0304112 A1* | 10/2015 | Langman | G06F 8/61 713/179 |

FOREIGN PATENT DOCUMENTS

| KR | 101471589 B1 | 12/2014 |
|---|---|---|
| KR | 20160020294 A | 2/2016 |

OTHER PUBLICATIONS

Piao, Yuxue, "Server-based Bytecode Obfuscation Scheme for Tamper Detection of Android Applications," Collection @ ssu, 2013, pp. 1-46.

* cited by examiner

METHOD, APPARATUS, SYSTEM AND NON-TRANSITORY COMPUTER READABLE MEDIUM FOR CODE PROTECTION

CROSS-REFERENCE TO RELATED APPLICATION(S)

This U.S. non-provisional application claims the benefit of priority under 35 U.S.C. § 119 to Korean Patent Application No. 10-2016-0015910 filed on Feb. 11, 2016 and Korean Patent Application No. 10-2016-0027824 filed on Mar. 8, 2016, both applications filed in the Korean Intellectual Property Office (KIPO), the entire contents of both of which are incorporated herein by reference.

BACKGROUND

Field

One or more example embodiments relate to a method, apparatus, system and/or non-transitory computer readable medium for protecting software code.

Description of Related Art

An intermediate language or InterLanguage (IL) may be a software programming language used as an intermediate stage when translating a source language program with a complier and making the source language program into a target language program. For example, if a high level language program is made into a machine language program by changing the high level language program to an assembly language and by assembling the changed assembly language, the assembly language is considered the intermediate language.

The conventional art discusses converting an intermediate language of a mobile platform, and discloses a C/C++ compiler configured to convert mobile platform source code developed with C or C++ language to an intermediate language code required by an interpreter of a mobile communication terminal. An intermediate language assembler converts the intermediate language code to a format executed at the interpreter of the mobile communication terminal.

Software code of an application that goes through the conversion to the intermediate language may be vulnerable to decompilation efforts due to various intrinsic characteristics of the intermediate code. For example, code of an application produced with a high level programming language, such as C sharp (C#), using a software tool, such as Unity, may be compiled in the form of an intermediate language, such as a dynamic linking library (DLL), and provided to a client electronic device and executed within a framework of the electronic device. Here, due to various characteristics of the intermediate language, the code may be corrected and compiled again as a new DLL by decompiling the originally compiled DLL, therefore allowing for forgery, reverse engineering, and/or unauthorized modification, etc. of the software application.

In the case of simply encrypting a file in a form of an intermediate language and providing the encrypted file to a client in order to prevent forgery, reverse engineering, unauthorized modification, etc., an electronic device of the client cannot execute the encrypted file and the application cannot be executed. In the case of providing a decryption device or information, for example, a decryption key, to the client in order to decrypt the encrypted file, the forgery, etc., issue of the application may arise again.

Also, the related art discloses technology for protecting software code by adding a protection module file configured in a binary code that is difficult to analyze to a package of a software application. However, even in this case, the code may be forged using a scheme of deleting the protection module file from the package.

Alternatively, in the related art associated with encrypting a file, the file may be slightly manipulated before a protection module is loaded. Thus, in this case, the protection module may not be detected. That is, the file may be forged by making a detour around the protection module.

SUMMARY

One or more example embodiments provide a code protection method, apparatus, system and/or non-transitory computer readable medium that may couple and provide code of an application to be protected and a protection module, thereby making it more difficult and/or impossible to execute the application without the protection module and reducing the chances of and/or preventing the protection module from being removed.

One or more example embodiments also provide a code protection method and system that may select a protection target code by coupling a protection module with a necessary code only, instead of protecting all of the code of the application.

One or more example embodiments also provide a code protection method, apparatus, system and/or non-transitory computer readable medium that may encrypt a code coupled with a protection module, may decrypt the encrypted code only at r execution point in time of the corresponding code, and may re-encrypt the decrypted code, thereby encrypting at least a portion of codes coupled with the protection module at all times even at an execution point in time of an application and protecting the code.

One or more example embodiments also provide a code protection method, apparatus, system and/or non-transitory computer readable medium that may move code of an application to be protected to a protection module and thereby protect the code and making it more difficult and/or impossible to statically analyze the code of the application. Additionally, the example embodiments may decrypt the code of the application moved to the protection module at an initial execution and periodically re-encrypt the code of the application, thereby making it possible to protect the code even with respect to dynamic analysis techniques, such as memory dumps.

One or more example embodiments also provide a code protection method, apparatus, system and/or non-transitory computer readable medium that may disarm an analysis method using a memory dump, etc., to perform a dynamic analysis since a code of an application stored in a protection module changes every time of runtime.

One or more example embodiments also provide a code protection method and system that may make difficult and/or prevent users from directly accessing a library file by converting or deleting the library file in a package file, and allows the users to access an encrypted library file through a protection module by adding the protection module that includes the encrypted library file to the package file, and thereby may make more difficult and/or prevent file forgery, reverse engineering, and/or unauthorized manipulation of the application by removing or making a detour around the protection module.

According to an aspect of at least one example embodiment, there is provided a code protection method including storing, using at least one processor, a package file that includes a plurality of files of an application on a storage device, transforming, using the at least one processor, execution code of a protection target method or function selected from at least one file of the plurality of files that includes the execution code, regenerating, using the at least one processor, the package file by adding, to the package file, a first protection module file for restoring the transformed protection target method or function, and transmitting, using the at least one processor, the regenerated package file over a network to an electronic device.

The transforming of the protection target method or function may include selecting the protection target method or function from the selected file that includes the execution code, cloning the selected protection target method or function, adding the cloned method or function to the first protection module file, transforming code included in the selected protection target method or function into execution code associated with the unknown instruction, and adding, to the execution code of the protection target method or function, discovery code for discovering the protection target method or function cloned to the first protection module file.

The selecting the protection target method or function from the selected file may include selecting a method or a function of a desired method or function from all of the methods or functions of the execution code as the protection target method or function, or selecting a method or a function corresponding to input information as the protection target method or function.

The transforming of the code may include transforming an instruction of the code into an instruction that jumps to a random memory address.

The adding of the discovery code may include adding a first code for calling a gateway to the selected protection target method or function, and adding a second code for acquiring a memory address of the cloned protection target method or function of the first protection module to the execution code of the gateway.

The memory address may be calculated based on the second code by using a program counter of the electronic device on which the application is installed and executed and a relative address value provided from the first protection module file.

The transforming of the protection target method or function may further include encrypting at least one instruction of the cloned protection target method or function of the first protection module file using a first encryption key or a first encryption algorithm, adding decryption code for decrypting the encrypted instruction to the cloned protection target method or function of the first protection module file.

The first protection module file may include a re-encryption function for re-encrypting the instruction using a second encryption key or a second encryption algorithm based on a desired condition associated with execution of the application on the electronic device and decryption of the encrypted instruction of the cloned protection target method or function of the first protection module file using the decryption code.

The method may include encrypting a selected library file from the plurality of files of the application using an encryption key, deleting the library file from the package file, adding the encrypted library file to the second protection module file, and the second protection module file includes a module configured to intercept a control command for the deleted library file at the electronic device on which the application is installed using the package file and to process the intercepted control command using the encrypted library file included in the second protection module file.

When the application is executed on the electronic device, a detour linker is generated in response to an open command for the second protection module file that is loaded to a memory of the electronic device, and the control command for the library file is intercepted by the detour linker.

The control command for the converted or deleted library file may include an open command for the deleted library file, and the second protection module file is configured to decrypt the encrypted library file in response to the intercepted open command and to generate and return a fake handle parameter providing instructions to a buffer that stores content of the decrypted library file.

The control command for the deleted library file may further include at least one command of the open command, a write command, and a discover command for the library file, and the second protection nodule file may be configured to process the at least one command by connecting to the buffer that stores the content of the decrypted library file based on the fake handle parameter in response to the intercepted at least one command.

The second protection module file may be configured to copy and return content corresponding to the read command from and to the buffer in response to the read command, to write content corresponding to the write command to the buffer in response to the write command, or to return a location of a file pointer corresponding to the discover command to the buffer in response to the discover command.

According to another aspect of at least one example embodiment, there is provided a non-transitory computer-readable medium storing computer readable instructions, which when executed by at least one processor, causes the at least one processor to execute a code protection method. The code protection method includes storing a package file that includes a plurality of files of an application on a storage device, the package file including, a first protection module file for restoring a transformed protection target method or function associated with the application, restoring the transformed protection target method or function using the first protection module file in response to execution of the application, the restoring including generating execution code based on the transformed protection target method or function and the package file, and executing the generated execution code using the first protection module file.

The method may further include cloning the protection target method or function, adding the cloned protection target method or function to the first protection module file, adding discovery code to the generated execution code for discovering the cloned protection target method or function in the first protection module file, and the executing of the generated execution code using the first protection module file comprises executing the generated execution code by discovering the cloned protection target method or function from the first protection module file using the discovery code with respect to the selected protection target method or function.

The at least one instruction of code included in the protection target method or function is transformed into an unknown instruction or an instruction that jumps to a random memory address.

According to another aspect of at least one example embodiment, there is provided a code protection method of an electronic device, the method including storing, using at least one processor of the electronic device, a package file that includes a plurality of files of an application on a storage device of the electronic device, the package file including a first protection module file for restoring a transformed protection target method or function associated with the application, restoring, using the at least one processor, the transformed protection target method or function using the first protection module file in response to execution of the application, the restoring including generating execution code based on the transformed protection target method or function and the package file, and executing, using the at least one processor, the generated execution code.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
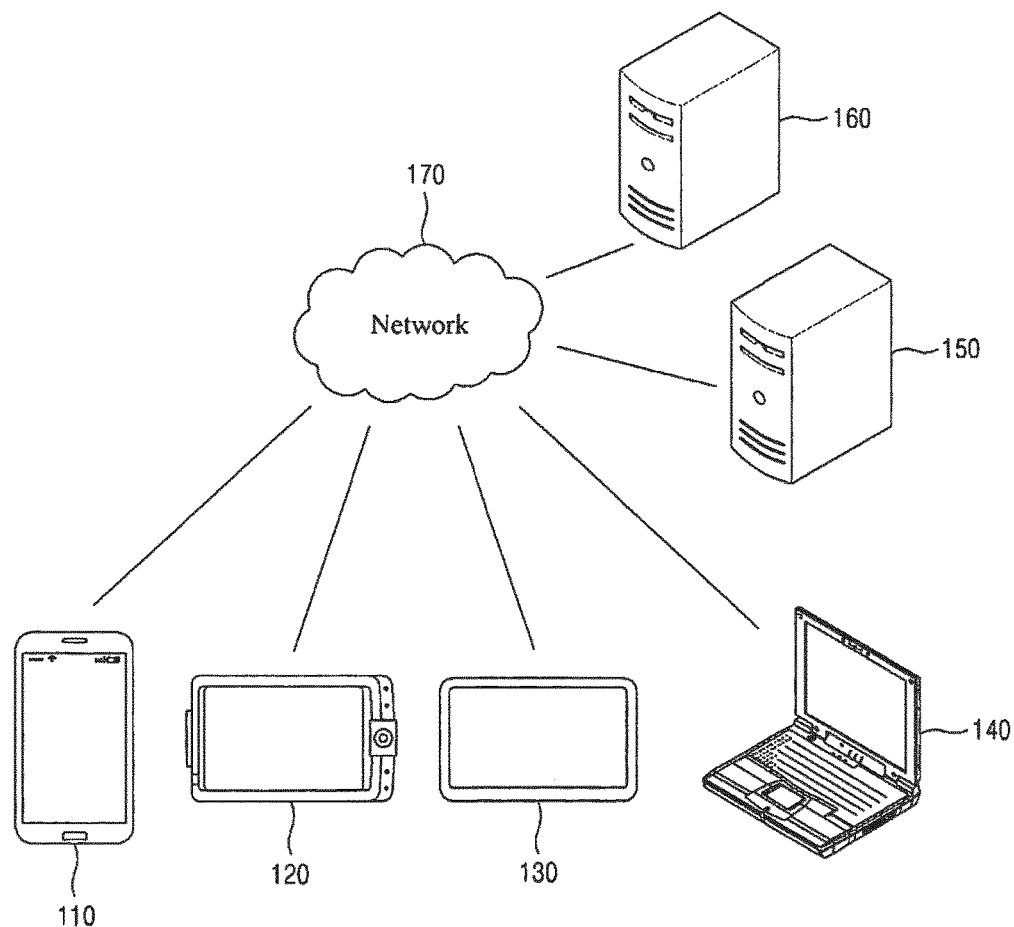
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital Signaler processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, various example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices acid/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), tablet personal computer (PC), a gaming console, an Internet of Things (IoT) device, a virtual reality device, an augmented reality device, a smart device, and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170.

For example, the server 150 may add a protection module file to a package of an application registered from the electronic device 120. The package of the application that includes the protection module file may be provided directly from the server 150 to the electronic device 110, or may be provided to the electronic device 110 through the separate server 160. The electronic device 110 may install and execute the application on the electronic device 110 through the package of the application, and may be provided with a specific service through the application. Here, a code of the application may be protected by the protection module file.

Figure 2:
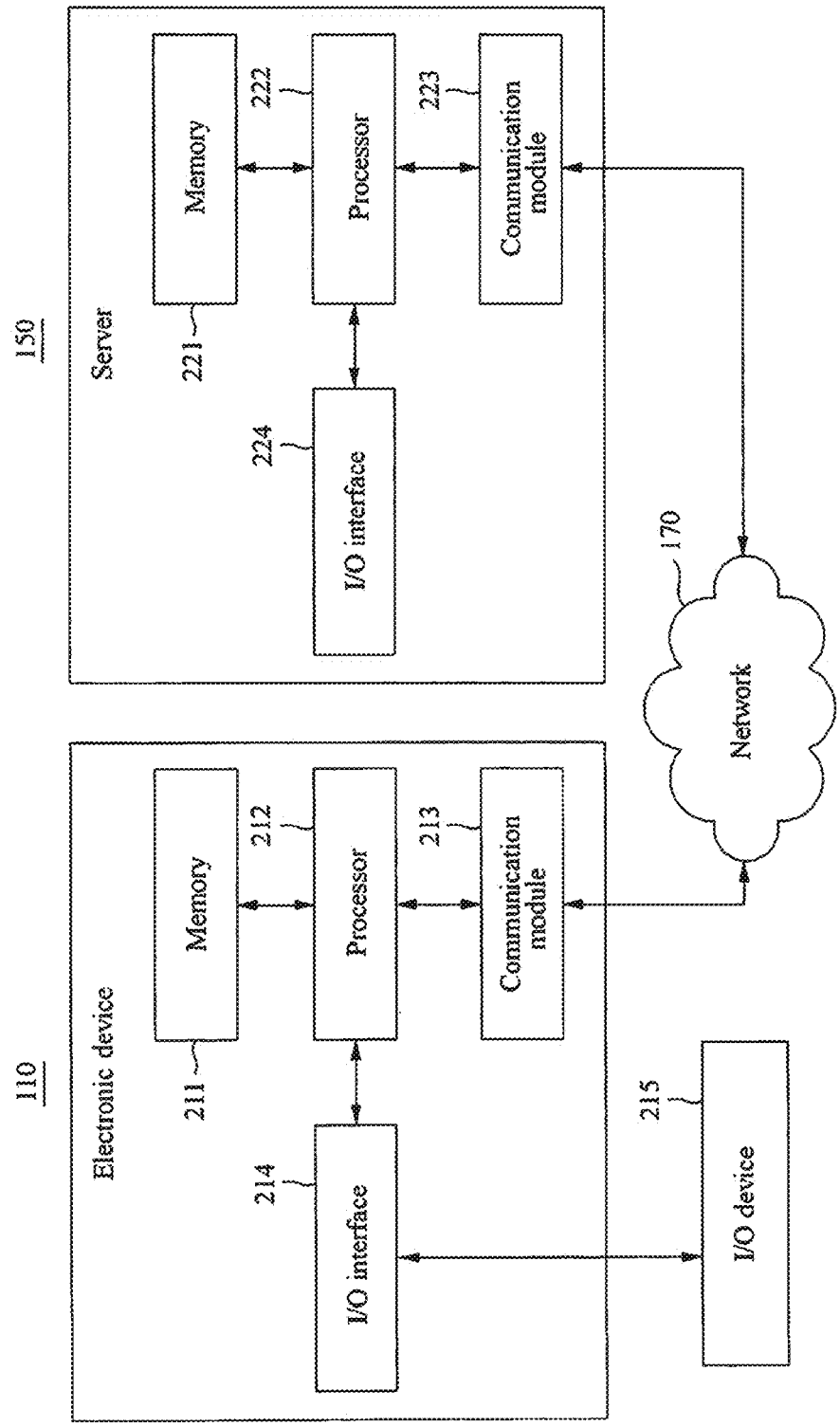
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, and the server 150 may include a memory 221, at least one processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, for example, a code for an application for video call, a browser, etc., installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM/Blu-ray drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for a video call service, generated based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing the computer readable instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like. In detail, if the electronic device 110 is a smartphone, the electronic device 110 may be configured to further include a variety of constituent elements, for example, an accelerometer sensor, a gyro sensor, a camera, various physical buttons, a button using a touch panel, an I/O port, a vibrator for vibration, etc., which are generally included in the smartphone.

Figure 3:
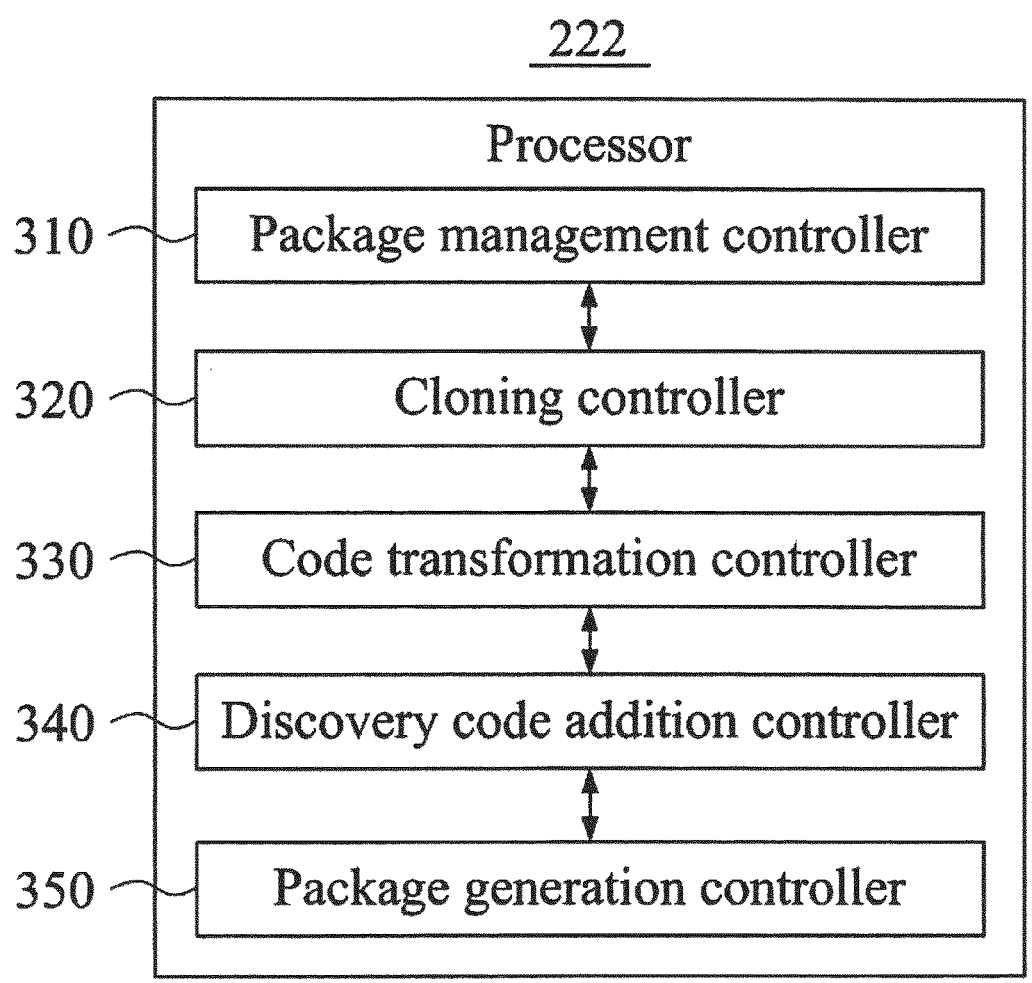
FIG. 3 is a block diagram illustrating an example of constituent elements included in at least one processor of a server according to at least one example embodiment.
Figure 4:
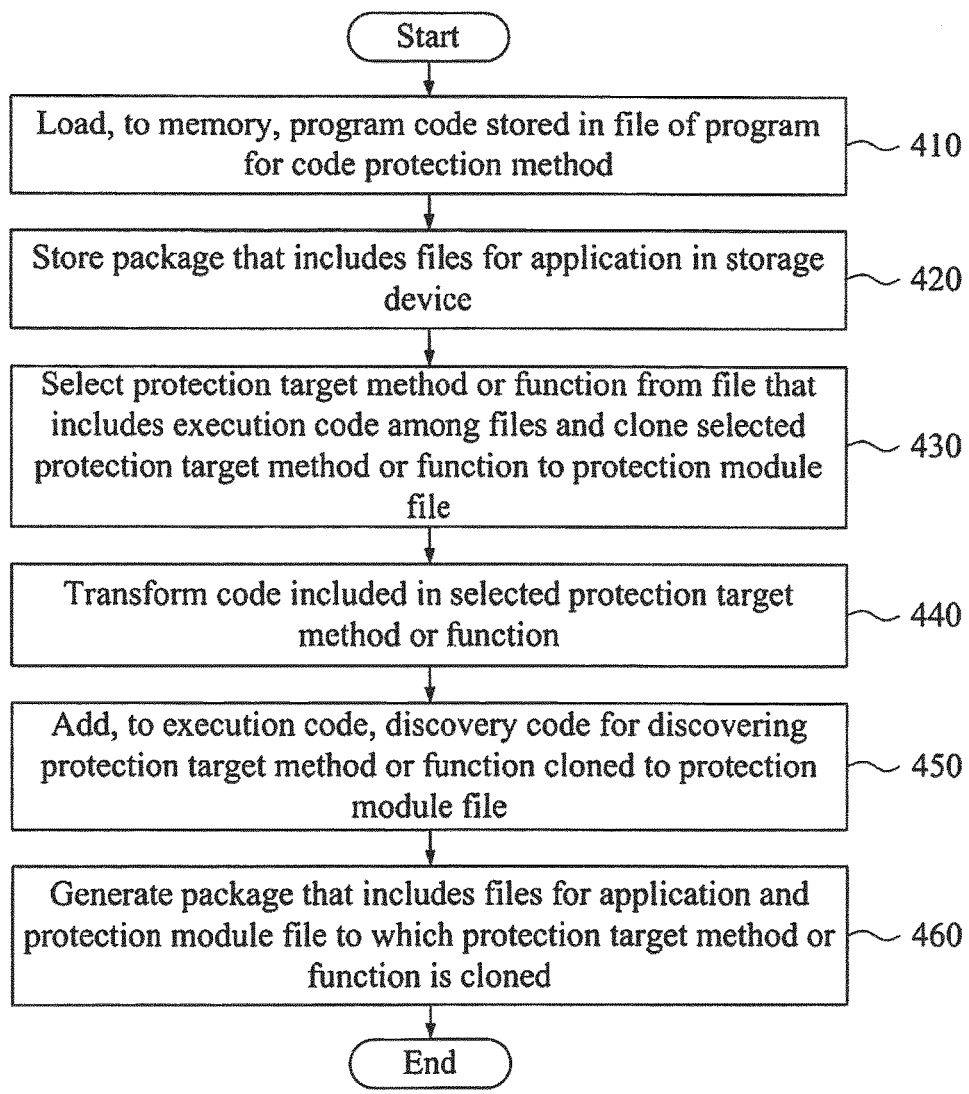
FIG. 4 is a flowchart illustrating an example of a method performed by a server according to at least one example embodiment.

FIG. 3 is a diagram illustrating an example of constituent elements included in at least one processor of a server according to at least one example embodiment, and FIG. 4 is a flowchart illustrating an example of a method performed by a server according to at least one example embodiment.

Referring to FIG. 3, the at least one processor 222 of the electronic device 150 may include a package management controller 310, a cloning controller 320, a code transformation controller 330, a discovery code addition controller 340, and a package generation controller 350, but is not limited thereto. The processor 222 and the constituent elements of the processor 222 may control the server 150 to perform operations 410 through 460 included in the code protection method of FIG. 4, but is not limited thereto. Here, the processor 222 and the constituent elements of the processor 222 may be configured to execute computer readable instructions according to code of at least one program and code of an OS included in the memory 221. Here, the constituent elements of the processor 222 may be representations of different functions performed at the processor 222 in response to a control command provided from the program code stored in the server 150. For example, the processor 222 may use the package management controller 310 as a functional representation that operates to store and manage a package in response to the control command.

In operation 410, the processor 222 may load, to the memory 221, program code stored in at least one file of a program for the code protection method. For example, in response to execution of the program at the server 150, the processor 222 may control the server 150 to load the program code from the file of the program to the memory 221 under control of the OS.

Here, the package management controller 310, the cloning controller 320, the code transformation controller 330, the discovery code addition controller 340, and the package generation controller 350 included in the processor 222 may be different functional representations of the processor 222 to perform operations 420 through 460 by executing a command of a portion corresponding to the program code loaded to the memory 221.

In operation 420, the package management controller 310 may store a package that includes files for an application in a storage device (e.g., at least one non-transitory computer readable medium). For example, a developer of the application (and/or distributor, authorized third party, etc.) may generate the package and may register the package to the server 150. In detail, the developer may connect to the server 150 over the network 170 using the electronic device 120, and may upload a package file to the server 150 using a user interface provided from the server 150. Here, the package management controller 310 may store and manage the package uploaded to the server 150 in a storage device of the server 150.

In operation 430, the cloning controller 320 may select at least one protection target method and/or function from at least one file that includes an execution code among the files of the package and may clone the selected at least one protection target method and/or function to at least one protection module file. For example, the cloning controller 320 may select a method or function of a desired and/or preset function from among the entire methods or functions of the execution code as the protection target method and/or function and may clone the selected method or function to the protection module file. In other words, a method or a function corresponding to the Java Native Interface (JNI) may be written in and/or preset in the Java programming language. The cloning controller 320 may discover the JIN-based method or function and may clone the JIN-based method or function to the protection module file.

As another example, the cloning controller 320 may select a method or a function corresponding to information input from the developer of the application as the protection target method and/or function and may clone the selected method or function to the protection module file. In other words, the server 150 may receive a name of a method or a function desired to be selected from the developer, may select the method or the function of the input name, and may clone the selected method or function to the protection module file. Optionally, the cloning controller 320 may select all of the method or function of the desired and/or preset function and the method or the function instructed by the developer.

To this end, the cloning controller 320 may control the server 150 to load the file that includes the execution code and the protection module file to the memory 221, and may control the server 150 to clone the method or the function selected from the execution code loaded to the memory 221 to the protection module loaded to the memory 221. The above process may be processed through various file operations related to the files of the package, such as a read command for the file that includes the execution code, for example, the file stored in the storage device of the server 150, a write command for the protection module file, etc. Hereinafter, a further description related to a process of loading data through the memory 221 or the storage device of the server 150 or writing data to the stored file is omitted.

In operation 440, the code transformation controller 330 may transform code included in the selected protection target method or function. For example, the code transformation controller 330 may transform an instruction of the code to an unrecognizable unknown instruction or an instruction that jumps to a random memory address. Accordingly, although the code is acquired through a function, such as a dump function related to a decompiler, an electronic device, for example, the electronic device 110, in which the application is installed and executed may be unaware of the original code due to the unrecognizable unknown instruction or the instruction that jumps to the random memory address.

In operation 450, the discovery code addition controller 340 may add, to the execution code, discovery code for discovering the protection target method and/or function cloned to the protection module file. The discovery code is code for searching the protection module file to acquire not the transformed code but the original code from the execution code. If the protection module file is deleted, the original code may not be acquired, the application may not execute properly, and stable code protection through the protection module is enabled.

For example, in operation 450, the discovery code addition controller 340 may add a first code for calling a gateway to the selected protection target method and/or function and may add a second code for acquiring a memory address of the protection target method and function cloned to the protection module file to the execution code as a gateway.

Here, the memory address may be calculated based on the second code by using a relative address value provided from the protection module file and a program counter of the electronic device on which the application is installed and executed as a factor. A process of discovering the protection target method and function cloned to the protection module file will be further described below.

In operation 460, the package generation controller 350 may generate the package that includes one or more files for and/or related to the application and the protection module file to which the protection target method and/or function is cloned. Here, since the code included in the protection target method and/or function is transformed in the file that includes the execution code of the application (e.g., the original execution code for the protection target method is replaced and/or modified to include code associated with the protection module), the application may not be normally executed without using the protection module file. Accordingly, it is possible to increase the difficulty of and/or prevent the protection module from being removed. Also, since the instruction of the code included in the protection target method and/or function is transformed in the execution code of the application, the original code may not be restored and/or the difficulty of restoring the original code is increased, thereby making it possible to protect the code and to prevent forgery of the code, reverse engineering of the code, unauthorized modification of the code, etc.

Figure 5:
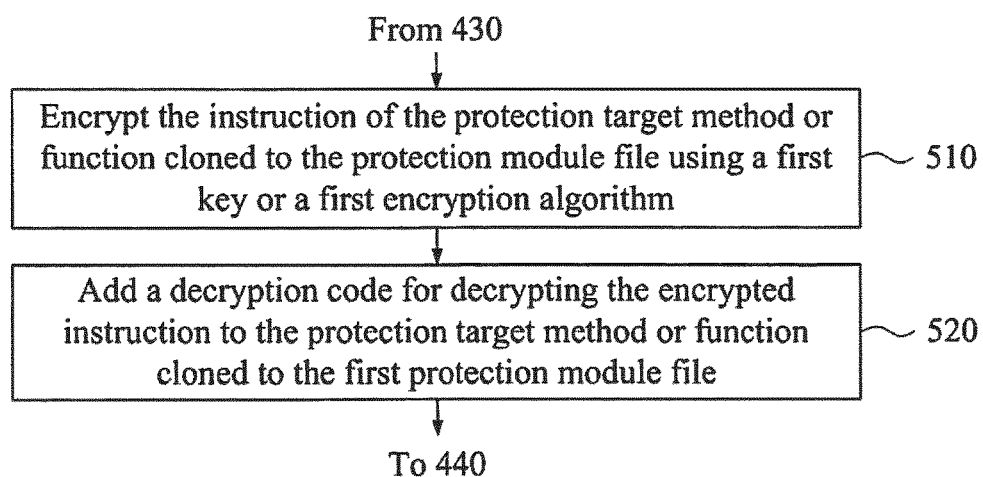
FIG. 5 is a flowchart illustrating an example of a process of adding encryption and decryption code of a protection target method and/or function according to at least one example embodiment.

FIG. 5 is a flowchart illustrating an example of a process of adding encryption and decryption code of a protection target method and/or function according to at least one example embodiment, but the method is not limited thereto. Operations 510 and 520 of FIG. 5 may be optionally included in the code protection method of FIG. 4 and thereby be performed. Although FIG. 5 illustrates an example embodiment that operations 510 and 520 are included and thereby performed between operations 430 and 440, the order of operations 510 and 520 is not limited thereto if they are performed after operation 430 and before operation 460. To perform operations 510 and 520, the processor 222 may further include an encryption controller (not shown) and a decryption code addition controller (not shown), or the operations may be performed by other aspects of the processor 222.

In operation 510, the processor 222 or the encryption controller may encrypt the instruction of the protection target method and/or function cloned to the protection module file using a first encryption key or a first encryption algorithm. Since the protection target method and/or function cloned to the protection module file through coupling is prepared using a high-level language, for example, Java or C++, a leakage probability of the protection target method and/or function from the protection module file is present. The leakage may be reduced and/or prevented by encrypting the protection target method and/or function.

In operation 520, the processor 222 or the decryption code addition controller may add a decryption code for decrypting the encrypted instruction to the protection target method and/or function cloned to the first protection module file. Here, the decryption code is generated in binary code, which is dissimilar to the cloned protection target method and/or function, and thus, may make analysis difficult.

A process of decrypting the encrypted instruction will be further described.

Hereinafter, the code protection method will be described from the perspective of the electronic device 110 that receives a package with reference to FIGS. 6 and 7.

Figure 6:
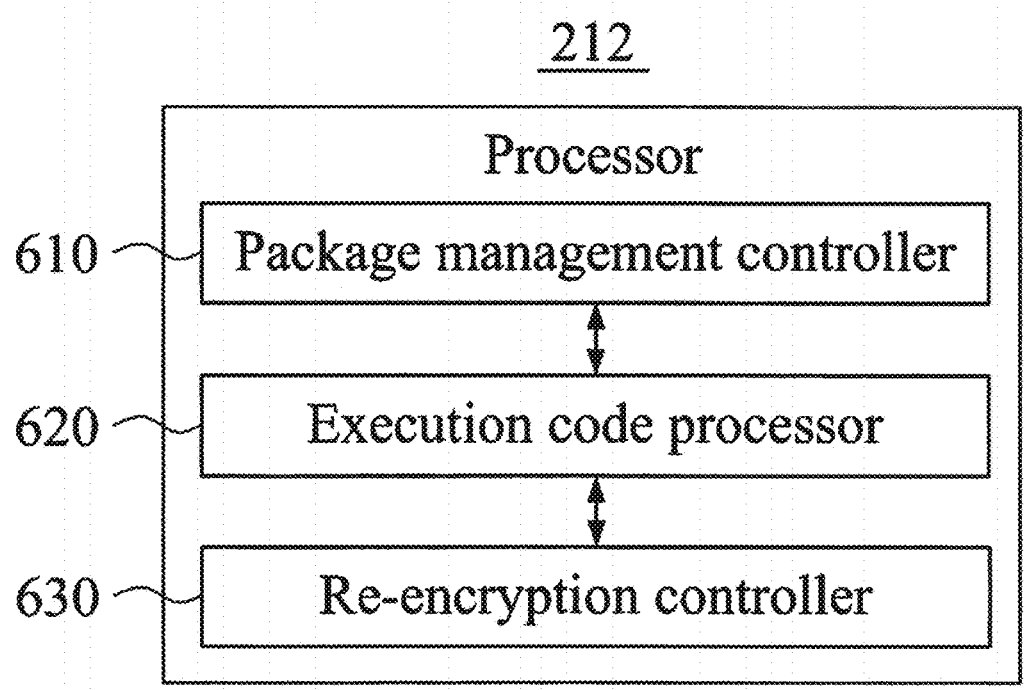
FIG. 6 is a block diagram illustrating an example of constituent elements included in at least one processor of an electronic device according to at least one example embodiment.
Figure 7:
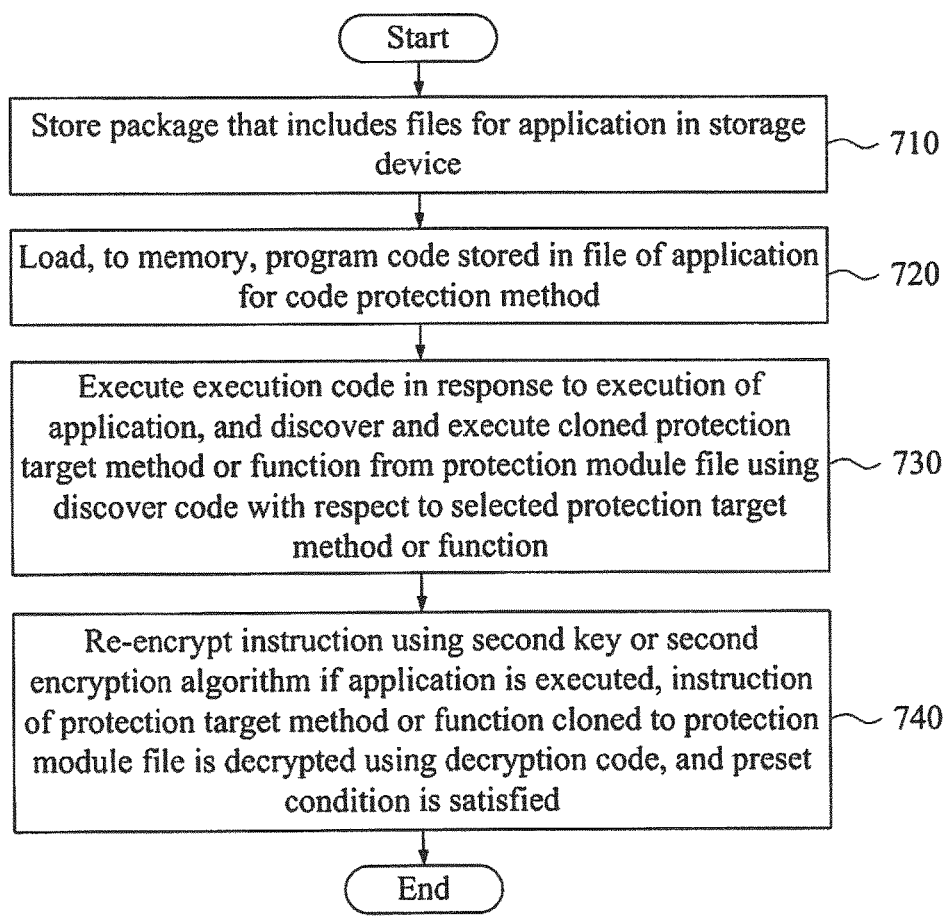
FIG. 7 is a flowchart illustrating an example of a method performed by an electronic device according to at least one example embodiment.

FIG. 6 is a diagram illustrating an example of constituent elements included in at least one processor of an electronic device according to at least one example embodiment, and FIG. 7 is a flowchart illustrating an example of a method performed by an electronic device according to at least one example embodiment.

Referring to FIG. 6, the processor 212 of the electronic device 110 may include a package management controller 610 and an execution code processor 620, and may further include a re-encryption controller 630 selectively based on some example embodiments, but is not limited thereto. The processor 212 and the constituent elements of the processor 212 may control the electronic device 110 to perform operations 710 through 740 included in the code protection method of FIG. 7. Here, the processor 212 and the constituent elements of the processor 212 may be configured to execute computer readable instructions according to the code of at least one program, for example, code of a package that includes a protection module file provided from the server 150, and code of an OS included in the memory 211. Also, the constituent elements of the processor 212 may be representations of different functions performed at the processor 212 in response to a control command provided from the program code stored in the electronic device 110. For example, the processor 212 may use the package management controller 610 as a functional representation that operates to control the electronic device 110 to store and manage a package in response to the control command.

In operation 710, the package management controller 610 may store a package that includes one or more files for an application in a storage device. For example, the package management controller 610 may control the electronic device 110 to store the package in the storage device of the electronic device 110 under control of the OS of the electronic device 110.

Here, the package refers to the package included in the protection module file described above with FIGS. 3 through 5, and may be a package directly downloaded from a server, such as the server 150 or downloaded through another server, for example, the server 160. Accordingly, the protection target method and/or function selected from execution code of the application may be cloned in the protection module file. Code included in the selected protection target method and/or function may be transformed and thereby included in the execution code. Also, discovery code for discovering the protection target method and/or function cloned to the protection module file may be added to the execution code.

In operation 720, the processor 212 may load, to the memory 211, a program code stored in the file of the application for the code protection method. For example, in response to execution of the application on the electronic device 110, the processor 212 may control the server 150 to load, to the memory 221, program code that includes the execution code in the package of the application under the control of the OS.

In operation 730, the execution code processor 620 may execute the execution code in response to the execution of the application. Here, with respect to the selected protection target method and/or function, the execution code processor 620 may discover and execute the cloned protection target method and/or function from the protection module file using the discovery code.

As described above, the code of the selected protection target method and/or function is transformed (e.g., replaced and/or modified) to include the unknown instruction or the instruction that jumps to a random memory address. Thus, the execution code may not be normally executed by only executing the execution code which includes the transformed code. In other words, the protection target method and/or function is replaced and/or modified so that the protected method and/or function is no longer executable if decompiled by an unauthorized party and recompiled. The original code is cloned to the protection module file (e.g., the original code is copied into the protection module file) and the program code of the protection module file is loaded to the memory 211. Thus, the execution code processor 620 may accurately execute the original execution code by discovering and executing the cloned protection target method and/or function loaded to the memory 211 using the discovery code. In other words, the discovery code includes code that locates, obtains, and loads the original execution code from the protection module file and executes the original execution code in place of the protection target method and/or function during runtime.

According to at least one example embodiment, the discovery code may include first code that is added to the selected protection target method and/or function and calls a gateway and second code that is added to the execution code as a gateway. In this case, in operation 730, the execution code processor 620 may discover and execute the cloned protection target method and/or function by calling the second code as the gateway based on the first code and by acquiring a memory address of the protection target method and/or function cloned to the protection module file through the second code. As described above, the memory address may be calculated based on the second code by using a relative address value provided from the protection module file and a program counter in response to execution of the application as a factor.

Also, as described above, (the instruction of) the protection target method and/or function cloned to the protection module file may be encrypted using the first key or the first encryption algorithm. For example, the execution code processor 620 may decrypt the encrypted instruction using a decryption code and/or decryption key added to the cloned protection target method or function.

In operation 740, if the application is executed, the instruction of the protection target method and/or function cloned to the protection module file is decrypted using the decryption code, and a desired and/or preset condition is satisfied, the encryption controller 630 may re-encrypt the instruction using a second key or a second encryption algorithm. Since an execution point in time of each protection target method and/or function is different, at least a portion of protection target methods and/or functions are present in an encrypted state at all times. Also, an encrypted protection target method (and/or function), a decrypted protection target method (and/or function), or a re-encrypted protection target method (and/or function) continuously varies for each execution point in time. Thus, protection target method and/or functions cloned to the protection module file have different values and the code may be further securely protected.

According to some example embodiments, it is possible to couple and provide a code of an application to be protected and a protection module, thereby making it more difficult and/or impossible to execute the application without the protection module and making it more difficult and/or preventing the protection module from being removed. Also, it is possible to select a protection target code by coupling a protection module with only the code that is necessary, instead of protecting all of the original software code. Also, it is possible to encrypt the code coupled with a protection module, to decrypt the encrypted code only at an execution point in time of the corresponding code, and to re-encrypt the decrypted code, thereby encrypting at least a portion of codes coupled with the protection module at all times even at an execution point in time of an application and protecting the code. Also, it is possible to move code of an application to be protected to a protection module and thereby protect the code, thereby making it more difficult and/or impossible to statically analyze the code of the application. Additionally, it is possible to decrypt the code of the application moved to the protection module at an initial execution and periodically re-encrypt, with a plurality of different encryption algorithms and encryption keys, the code of the application, thereby making it possible to protect the code even with respect to dynamic analysis techniques. For example, since the code of an application stored in the protection module would change every time it is executed (e.g., changed at runtime), it is possible to disarm an analysis method using a memory dump technique, etc., to perform dynamic analysis of the code.

Hereinafter, example embodiments of a code protection method will be further described.

Figure 8:
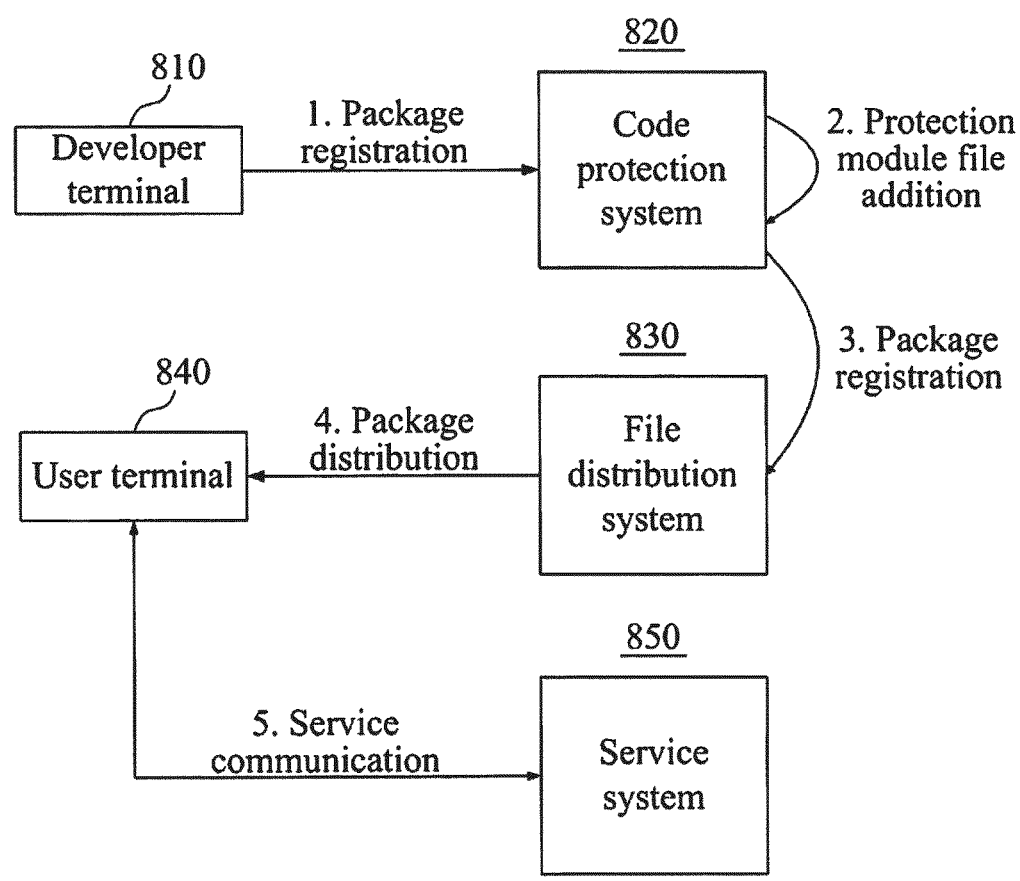
FIG. 8 is a diagram illustrating an example of a process of adding, by a server, a protection module file to a package and transmitting the package to an electronic device according to at least one example embodiment.

FIG. 8 is a diagram illustrating an example of a process of adding, at a server, a protection module file to a package and transmitting the package to an electronic device according to at least one example embodiment.

FIG. 8 illustrates a developer terminal 810, a code protection system 820, a file distribution system 830, a user terminal 840, and a service system 850. The developer terminal 810 may be an electronic device used by a developer, or other authorized party, of an application. The user terminal 840 may be an electronic device used by a user of the application. The code protection system 820 may correspond to the server 150, and the file distribution system 830 and the service system 850 may be individual servers. According to other example embodiments, the code protection system 820, the file distribution system 830, and/or the service system 850 may be systems that are operated by the same entity or may be a single system. Also, the service system 850 may be a server system that is operated by the developer, or other authorized party, and may be a server system that operates based on a service-side program provided from a third party different from the developer. For example, the service system 850 may be a game server that provides an online game service through a game application, but is not limited thereto. In this case, the user terminal 840 may be provided with a game service by connecting to a game server through the game application.

1. A package registration process may be a process in which the developer terminal 810 registers a package of an application developed by a developer, or other authorized party, to the code protection system 820. For example, the package may be uploaded from the developer terminal 810 to the code protection system 820 through data communication over a network, for example, the network 170 of FIG. 1, between the developer terminal 810 and the code protection system 820. Description related to data communication over the network is omitted.

2. A protection file addition process may be a process in which the code protection system 820 adds a protection module file to the registered package of the application. During this process, the code protection method described with FIGS. 4 and 5 may be performed at the code protection system 820.

3. A package registration process may be a process in which the code protection system 820 registers, to the file distribution system 830, the package to which the protection module file is added. According to other example embodiments, the code protection system 820 may provide, to the developer terminal 810, the package to which the protection module file is added, and the developer terminal 810 may directly register on the file distribution system 830 the package to which the protection module file is added.

4. A package distribution process may be a process in which the file distribution system 830 distributes over the network to the user terminal 840, the package to which the protection module file is added in response to a request from the user terminal 840. According to other example embodiments, the package may be distributed to the user terminal 840 using a non-transitory computer readable medium, such as an optical disk, memory card, etc. The application may be installed on the user terminal 840 through the package to which the protection module file is added.

5. A service communication process may be a process in which the user terminal 840 uses a service through communication with the service system 850 based on the executed application.

Figure 9:
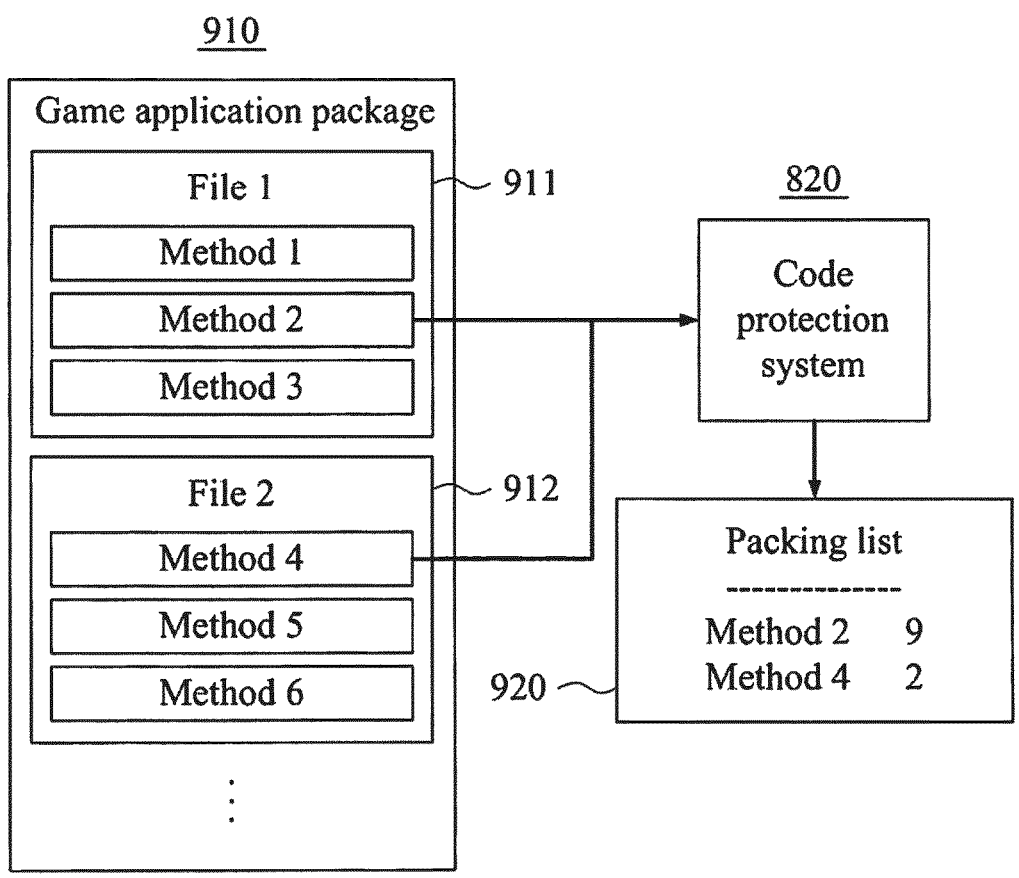
FIG. 9 is a diagram illustrating an example of a process of selecting a protection target method and function according to at least one example embodiment.

FIG. 9 illustrates an example of a process of selecting a protection target method and/or function according to at least one example embodiment. FIG. 9 illustrates a game application package 910, but the example embodiments are not limited thereto and the application may be any software application. Referring to FIG. 9, the game application package 910 may include a plurality of files, for example, a file 1 911 and a file 2 912.

Here, the code protection system 820 of FIG. 8 may generate a packing list 920 by selecting a protection target method and/or function based on a desired and/or preset rule or information input from a developer. For example, if a method 2 is selected as the protection target method, a protection target list in which an identifier "method 2" of the selected method and an index "9," which is a random unique value, are matched and may be generated in the packing list 920. Also, if a method 4 is additionally selected as the protection target method, a protection target list in which an identifier "method 4" of the selected method and an index "2" which is a random unique value, are matched and may be generated in the packing list 920.

The code protection system 820 may identify the selected protection target method (and/or function) based on the generated packing list 920.

Figure 10:
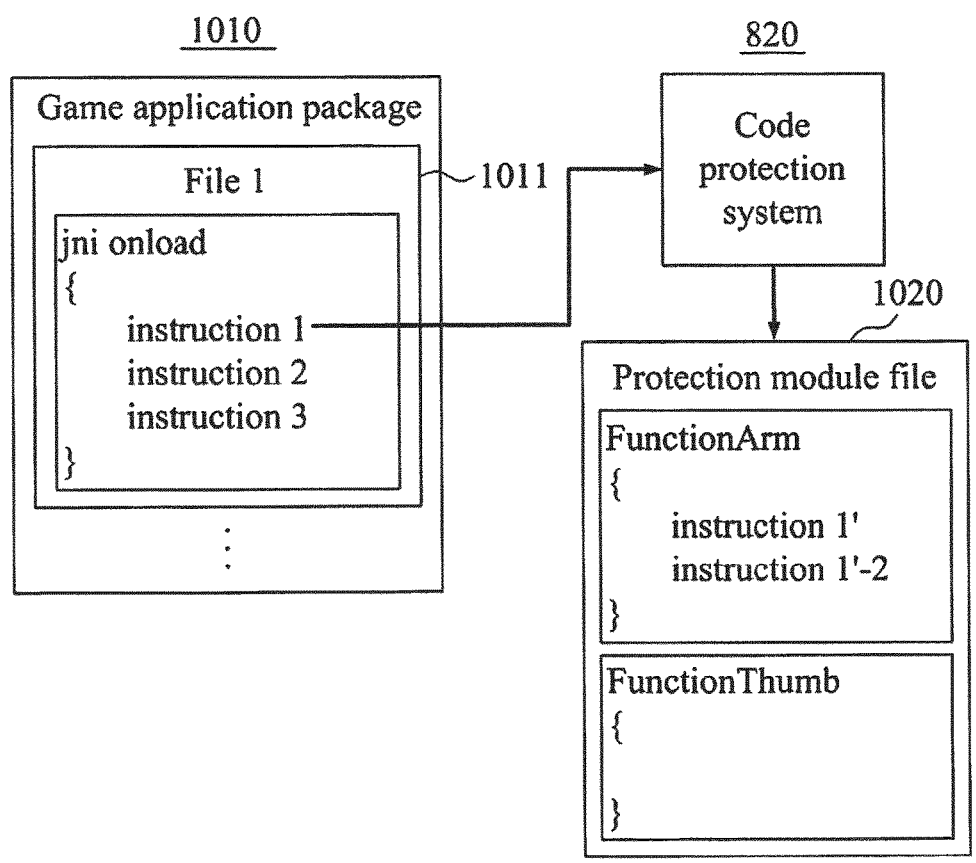
FIG. 10 is a diagram illustrating an example of a process of cloning a protection target method and/or function to a protection module file according to at least one example embodiment.

FIG. 10 illustrates an example of a process of cloning a protection target method and/or function to a protection module file according to at least one ex e embodiment. FIG. 10 illustrates an example of cloning a first instruction "instruction 1" of a function "jni unload" from a file 1 1011 of a game application package 1010 to a protection module file 1020 using the code protection system 820. Here, the code protection system 820 may discover a selected protection target method and/or function based on the packing list 920 of FIG. 9, but is not limited thereto.

In general, at least a single instruction may be identically cloned to the protection module file 1020. Also, an instruction in which a current program counter value affects an operation code (opcode) value may be converted, that is, translated to at least two instructions and thereby cloned. For example, an instruction that is diverged to be separate from a current program counter by a desired amount, such as 4 M bytes or more, may be translated into at least two instructions and thereby cloned in order to apply the divergence. In other words, during the cloning process, the original instruction may be split into two instructions, e.g., the first instruction being a jump instruction or the like, to a second instruction that is at a different program counter location, e.g., a desired amount away (4 M bytes away), and thus turned into two instructions. However, the example embodiments are not limited thereto and may include any number of instructions.

Also, an instruction may be cloned for separate modes and environments and the appropriate cloned instruction may be accessed based on a determined mode and/or environment of the electronic device that is executing the instruction. For example, an arm mode of an instruction may be defined using a first desired amount, e.g., 4 bytes, and a thumb mode of an instruction may be defined using a different, second desired amount, e.g., 2 bytes, with the arm mode and/or thumb mode selected based on, for example, the type of OS that is being executed by the electronic device, such Android OS, iOS, Windows, Linux, Unix, etc., the type of processor included in the electronic device, such as ARM-based processor or ×86 processor, etc., and other factors. Additionally, each of the different modes, for example, the "FunctionArm" and the "FunctionThumb", may be cloned in different areas, in the protection module file 1020. Conversion, i.e., translation of an instruction may be processed by an instruction translator called by the code protection system 820. Here, the code protection system may call an instruction translator for the arm mode and an instruction translator for the thumb mode. As another example, an instruction translator for a thumb 2 may be further used.

Also, translation of an instruction may include a process of integrating a plurality of instructions into a single instruction for a code optimization. For example, instructions unnecessarily included in a compiling process of an execution code may be removed.

Here, since the code of a protection module file are variably loaded to a memory, an instruction may be translated based on a variable memory address. The variable memory address may be based on a relative address value provided from the protection module file.

Figure 11:
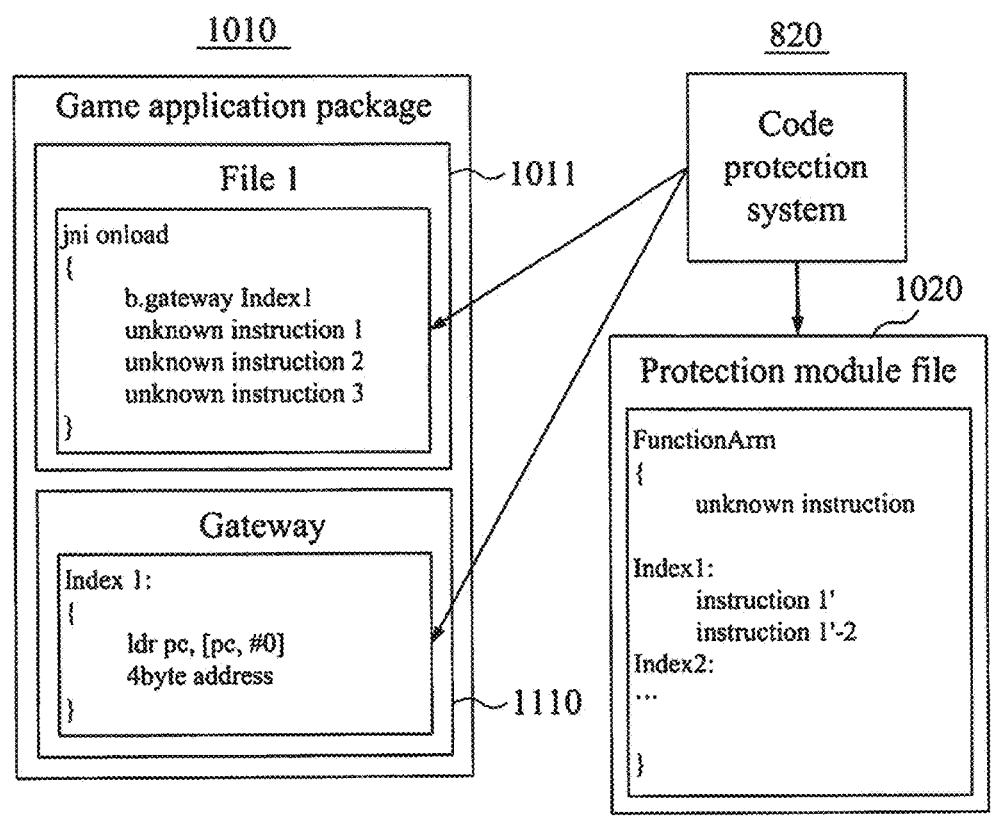
FIG. 11 is a diagram illustrating an example of a process of adding a gateway and transforming an instruction of a code according to at least one example embodiment.

FIG. 11 is a diagram illustrating an example of a process of adding a gateway and transforming an instruction of a code according to at least one example embodiment.

As described above, an address at which codes of a protection module file are loaded to a memory is variable. The code protection system 820 may add a first code "b.gateway Index1" for calling a gateway 1110 to a protection target method (and/or function), and may add a section of a second code for the gateway 1110 to an application package, such as game application package 1010 (and/or execution code). Here, a 4-byte address may be a relative address value provided from the protection module file 1020 in response to execution of an application on the user terminal 840. An instruction of a cloned protection target method (and/or function) may be discovered from the code of the protection module file 1020 uploaded to the memory through the gateway 1110 and be executed. Existing instructions may be transformed into an unknown instruction (and/or an invalid instruction, such as a method or function call to an undefined method or function, etc.) or an instruction that jumps to a random address. An index such as "Index1" may be managed using the packing list 920.

Figure 12:
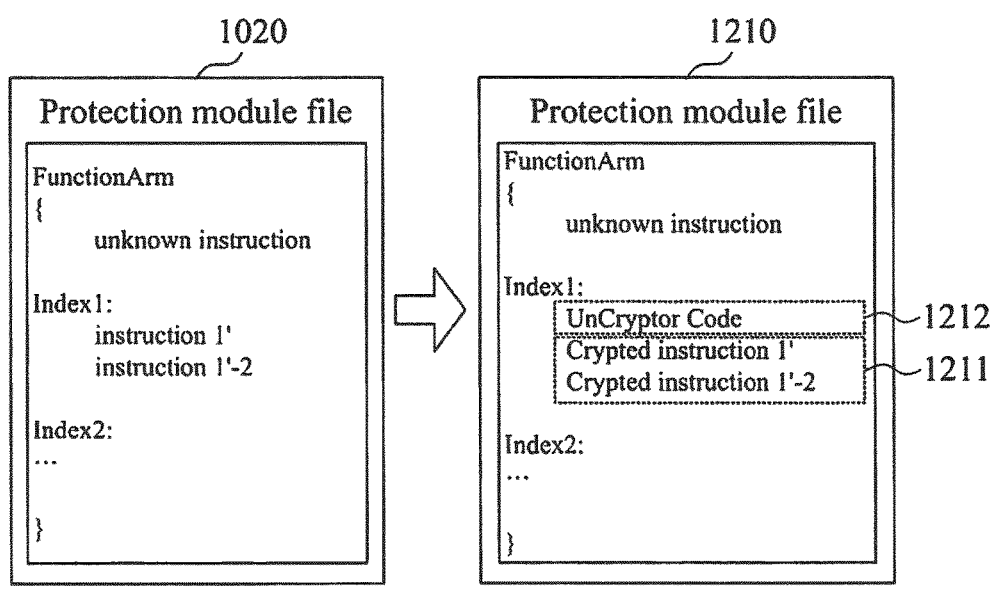
FIG. 12 is a diagram illustrating an example of a process of encrypting an instruction of a cloned protection target method and/or function according to at least one example embodiment.

FIG. 12 is a diagram illustrating an example of a process of encrypting an instruction of a cloned protection target method and/or function according to at least one example embodiment. FIG. 12 illustrates an example of changing the protection module file 1020 of FIG. 11 to a protection module file 1210 in which cloned instructions are encrypted. A first box 1211 indicated with dotted lines indicates that cloned instructions are encrypted, and a second box 1212 indicated with dotted lines indicates that a decryption code for decrypting encrypted instructions is added.

A decryption code "UnCryptor Code" may be configured to decrypt the encrypted instructions at its initial execution and to simply jump to a decrypted instruction after the instructions are decrypted.

Figure 13:
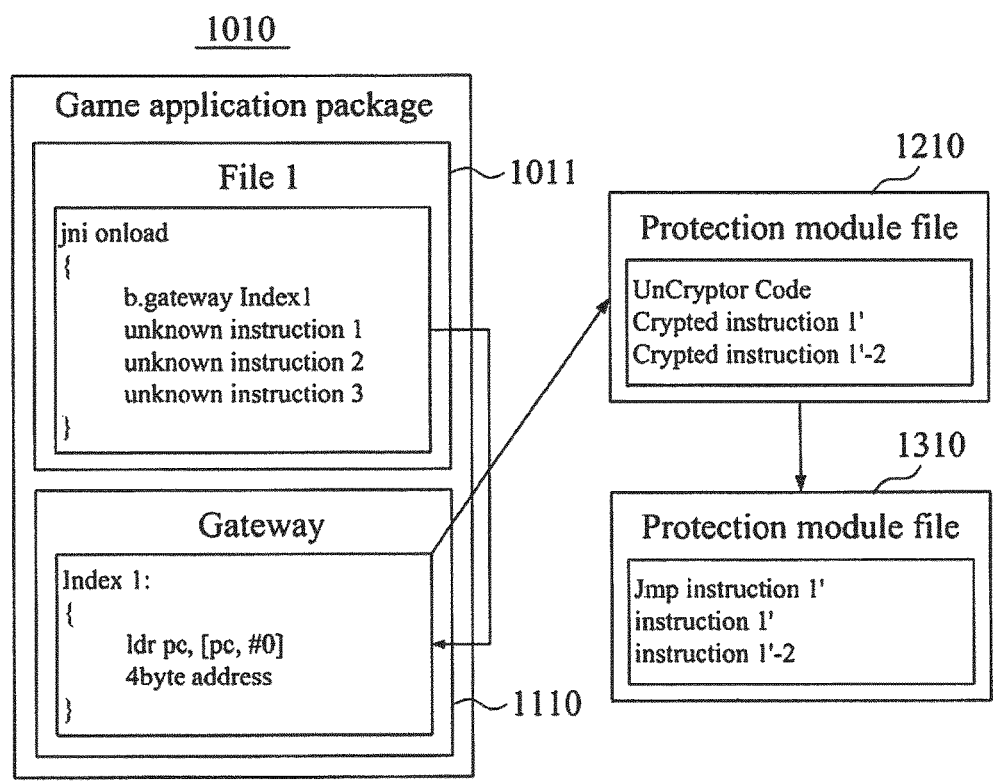
FIG. 13 is a diagrams illustrating an example of an entire flow of a protection operation according to at least one example embodiment.

FIG. 13 is a diagram illustrating an example of an entire flow of a protection operation according to at least one example embodiment. In response to execution of an application on the user terminal 840, the user terminal 840 may be provided with a service in such a manner that the game application package 1010 sequentially executes an execution code loaded to the memory. If a protection target function "jni unload" of the file 1 1011 is to be executed, the user terminal 840 may call the gateway 1110 in response to an instruction "b.gateway Index1" and may discover a protection target method and/or function cloned to the protection module file 1210 in response to an instruction included in "Index1" of the gateway 1110.

A value, such as "4 byte address," associated with the gateway 1110 may be provided to the gateway 1110 as a relative address value of the memory once a code for a protection module is loaded from the protection module file 1210 to the memory. The user terminal 840 may discover an area in which the protection target function "jni onload" is cloned from the protection module file 1210, substantially, a protection module code loaded to the memory, through the gateway 1110 using the gateway value (e.g., "4 byte address"). The user terminal 840 may decrypt encrypted instructions using decryption code, e.g., "UnCryptor Code". The protection module file 1310, substantially, a protection module code loaded to the memory, represents the decrypted encrypted instructions. Here, the code "UnCryptor Code" is changed to code, for example, to jump to a location where the decrypted code is located, for example, to jump to "instruction 1". Accordingly, the user terminal 840 may acquire an instruction for the protection target function "jni onload".

Instructions decrypted based on a desired and/or preset condition may be re-encrypted using another key, for example, a second key, or another encryption algorithm, for example, a second encryption algorithm. While only two encryption keys/algorithms are discussed, the example embodiments are not limited thereto and there may be two or more encryption keys/algorithms used.

Figure 14:
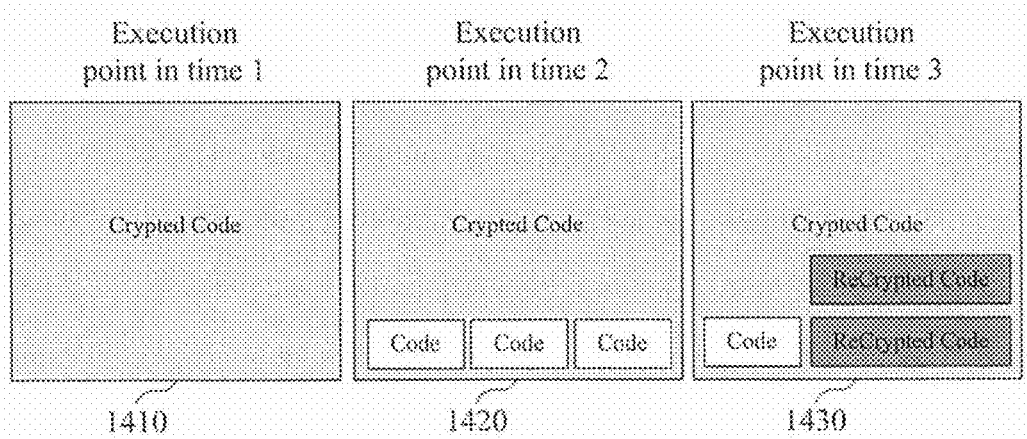
FIG. 14 illustrates an example of encrypting and decrypting an instruction based on an execution point in time according to at least one example embodiment.

FIG. 14 illustrates an example of encrypting and decrypting an instruction based on an execution point in time according to at least one example embodiment.

A first box 1410 at an execution point in time 1 represents a state in which codes cloned to a protection module file are encrypted. Here, referring to the first box 1410, all of the initially cloned codes may be present in an encrypted state.

A second box 1420 at an execution point in time 2 represents a state in which some codes are decrypted and the decrypted codes "Code" are present.

A third box 1430 at an execution point in time 3 represents a state in which a portion of the decrypted codes are re-encrypted and the re-encrypted codes "ReCrypted Code" are present.

As described above, decryption is performed at an execution point in time of each of instructions in response to execution of an application and re-encryption for an encrypted instruction is performed. Thus, a protection module file includes different code values for each execution point in time. Accordingly, although the protection module file is analyzed, it is difficult and/or impossible to acquire the original code, thereby reducing the likelihood and/or preventing forgery, reverse engineering, and/or unauthorized access, etc., of the original code. A condition for re-encrypting instructions may be desired and/or preset using a variety of conditions, such as a case in which an application is switched to operate in a background mode, immediately after instructions are decrypted and executed, and the like.

Figure 15:
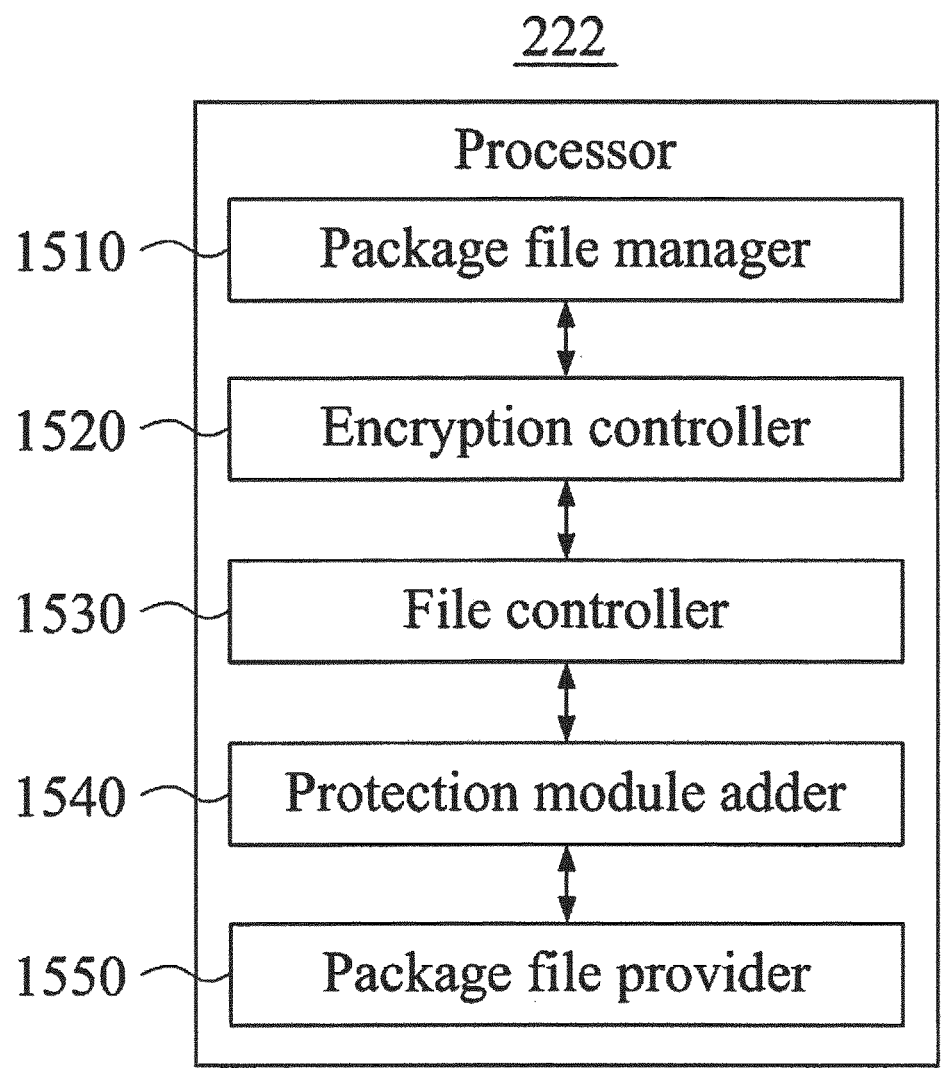
FIG. 15 is a block diagram illustrating another example of constituent elements included in at least one processor of a server according to at least one example embodiment.
Figure 16:
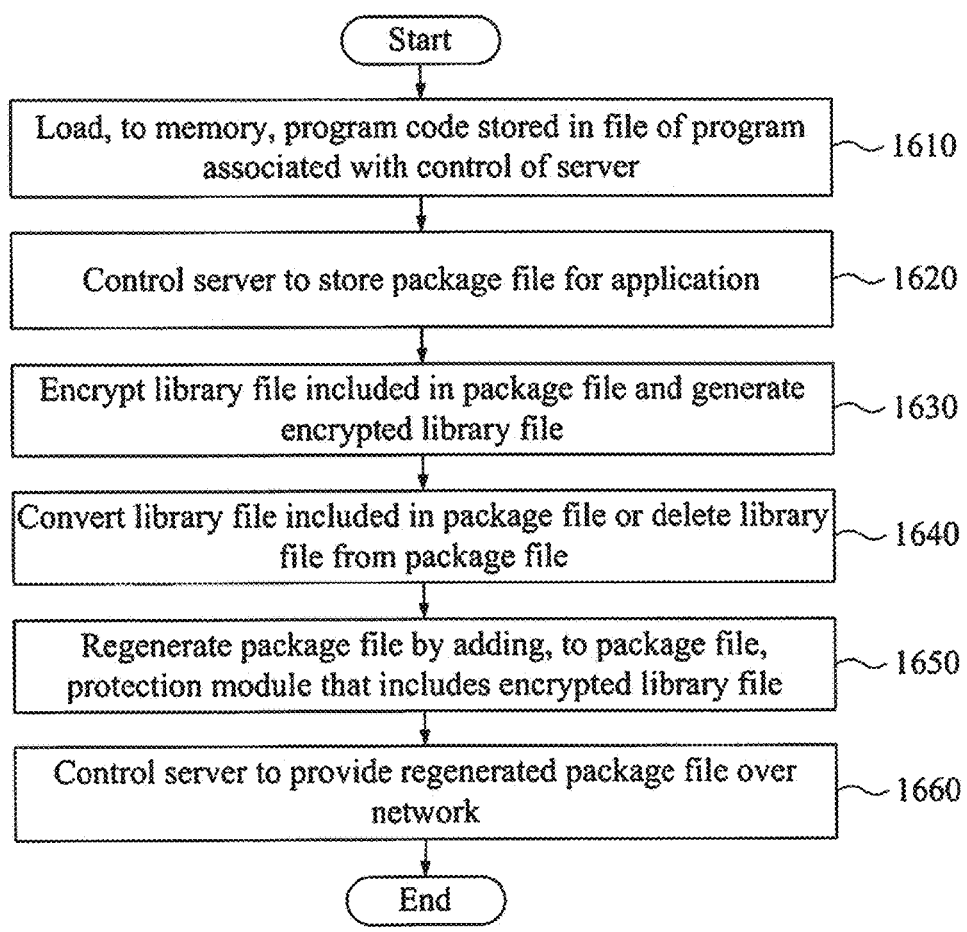
FIG. 16 is a flowchart illustrating another example of a method performed by a server according to at least one example embodiment.

FIG. 15 is a block diagram illustrating another example of constituent elements included in at least one processor of a server according to at least one example embodiment, and FIG. 16 is a flowchart illustrating another example of a method performed by a server according to at least one example embodiment.

The server 150 may configure a code protection system according to other example embodiments. Referring to FIG. 15, the at least one processor 222 of the server 150 may include a package file manager 1510, an encryption controller 1520, a file controller 1530, a protection module adder 1540, and/or a package file provider 1550 as constituent elements, but is not limited thereto. The processor 222 and the constituent elements of the processor 222 may control the server 150 to perform operations 1610 through 1660 included in a code protection method of FIG. 16. Here, the processor 222 and the constituent elements of the processor 222 may be configured to execute a computer readable instruction according to code of at least one program and a computer readable instruction according to code of an OS included in the memory 221. Here, the constituent elements of the processor 222 may be representations of different functions of the processor 222 performed at the processor 222 in response to a control command provided from a program code stored in the server 150. For example, the package file manager 1510 may be used as a functional representation of the processor 222 to control the server 150 to store a package file for an application in response to the control command.

In operation 1610, the processor 222 may load, to the memory 221, a program code stored in a file of a program associated with control of the server 150. For example, the processor 222 may control the server 150 to load the program code from the file of the program to the memory 221 under control of the OS. For example, the file of the program may include at least a portion of codes for controlling the processor 222 to perform operations 1620 through 1660, but is not limited thereto.

In operation 1620, the package file manager 1510 may control the server 150 to store at least one package file for an application. For example, the package file may be input to the server 150 through the I/O interface 224 or may be received at the server 150 through the communication module 223. The server 150 may store and manage the input or received package file in a permanent storage device, such as a memory card, an optical disk, a disk drive, etc., under control of the package file manager 1510. For example, the package file may be a package of an application generated by compiling a code developed by a developer and then gathering all of files.

In operation 1630, the encryption controller 1520 may encrypt a library file included in the package file and may generate the encrypted library file. A method of encrypting the library file may use one of known encryption methods, but is not limited thereto.

In operation 1640, the file controller 1530 may convert the library file included in the package file, replace the library file in the package file, or may delete the library file from the package file. For example, the file controller 1530 may convert a code or an instruction included in the library file to an unknown code or instruction, or may delete the library file from the package file, thereby reducing access and/or preventing users from accessing content of the library file.

In operation 1650, the protection module adder 1540 may regenerate the package file by adding, to the package file, a protection module that includes the encrypted library file. In the case of simply converting, replacing, and/or deleting the library file, the application cannot be normally executed through the package file. Thus, the server 150 may include the encrypted library file in the protection module and thereby add the encrypted library file to the package file under control of the protection module adder 1540. In this manner, it is possible to reduce and/or prevent access to the library file and at the same time to allow access to the library file only through the protection module.

In operation 1660, the package file provider 1550 may control the server 150 to provide the regenerated package file over the network 170. The regenerated package file may be transmitted directly to a terminal of a user, for example, the electronic device 110 over the network 170, and may be transferred to the terminal of the user through a separate server, for example, the server 160. As another example, the regenerated package file may be transmitted to a terminal of the developer over the network 170 and may be uploaded from the terminal of the developer to a separate server to be transferred to the terminal of the user. Additionally, the regenerated package file may be provided to the terminal of the user via a non-transitory computer readable medium.

Here, the protection module, for example, the protection module included in the protection module file, may be configured to intercept and/or hook a control command for the converted or deleted library file at the electronic device on which the application is installed through the package file. Additionally, the protection module may process the intercepted control command using the encrypted library file included in the protection module. The protection module that operates on the electronic device will be further described below.

Figure 17:
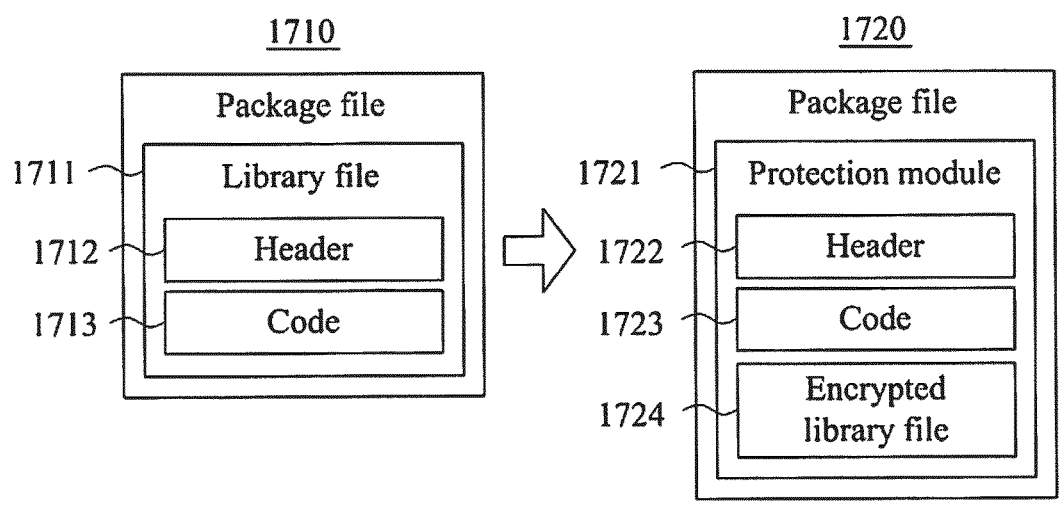
FIG. 17 is a diagram illustrating an example of adding a protection module to a package file according to at least one example embodiment.

FIG. 17 is a diagram illustrating an example of adding a protection module to a package file according to at least one example embodiment. A package file 1710 input to or received at the server 150 may include at least one library file 1711. For example, in an Android OS, the library file 1711 may have an extender of ".so", for example, "libGame.so", and may be configured to at least include a header 1712 and a code 1713. In the related art, a protection module file is added to the package file 1710 for protection of the package file 1710. However, as described above, the library file 1711 may be forged by deleting the protection module file or by accessing the library file 1711 before the protection module is loaded to a memory.

To reduce and/or prevent such forgery (and/or unauthorized manipulation or reverse engineering), the example embodiment may generate a package file 1720 by adding a protection module 1721 that includes an encrypted library file 1724 to the package file 1710, and by deleting the library file 1711 from the package file 1710. Accordingly, users of the package file 1720 may not delete the protection module 1721 and may not easily access the contents of the library file 1711. The protection module 1721 may further include a header 1722 and a code 1723 for a protection function for the package file 1720 and/or a decryption function of the encrypted library file 1724, and the like.

Figure 18:
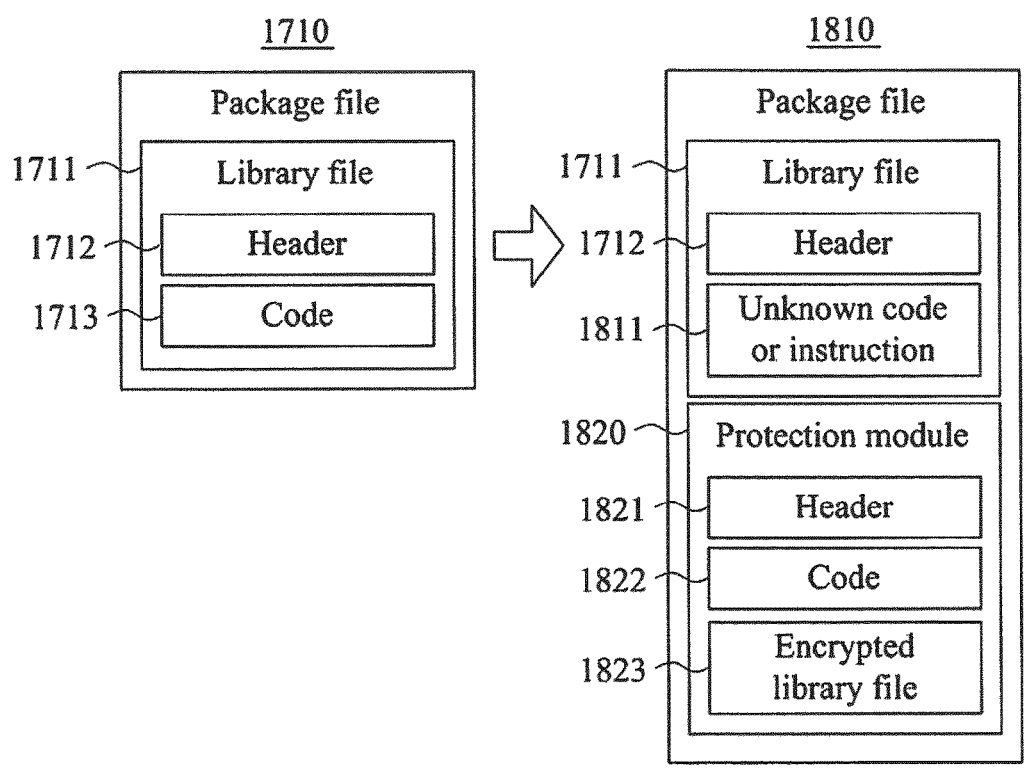
FIG. 18 is a diagram illustrating another example of adding a protection module to a package file according to at least one example embodiment.

FIG. 18 is a diagram illustrating another example of adding a protection module to a package file according to at least one example embodiment. Referring to FIG. 18, similar to the example embodiment of FIG. 17, the protection module 1820 that includes the encrypted library file 1823 may be added to the package file 1710. Additionally, in FIG. 18, a package file 1810 may be generated by transforming the code 1713 to an unknown code or instruction 1811 incapable of being translated at the terminal of the user instead of, or in addition to, deleting the library file 1711. Even in this case, users of the package file 1810 may not easily access the content of the library file 1711. If the protection module 1820 is removed, the application cannot be normally executed, thereby discouraging and/or preventing the protection module 1820 from being deleted. The protection module 1820 may further include a header 1821 and a code 1822 for a protection function for the package file 1810 and/or a decryption function of the encrypted library file 1823, and the like.

Hereinafter, example embodiments will be described from perspective of the electronic device 110 that receives a package file regenerated at and provided from the server 150.

Figure 19:
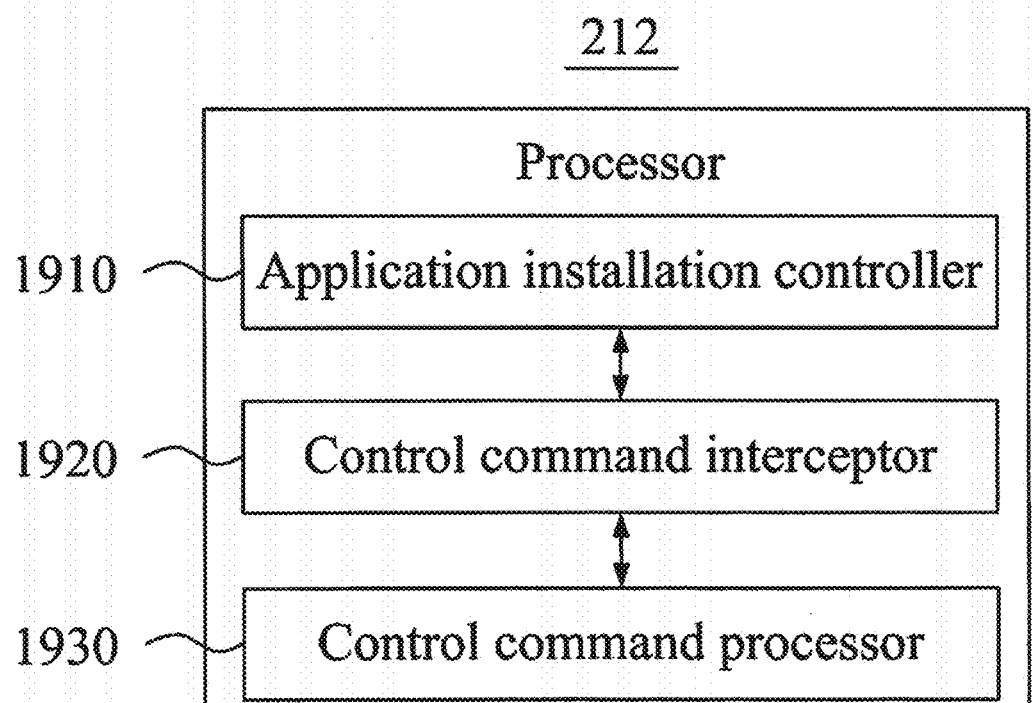
FIG. 19 is a block diagram illustrating another example of constituent elements included in at least one processor of an electronic device according to at least one example embodiment.
Figure 20:
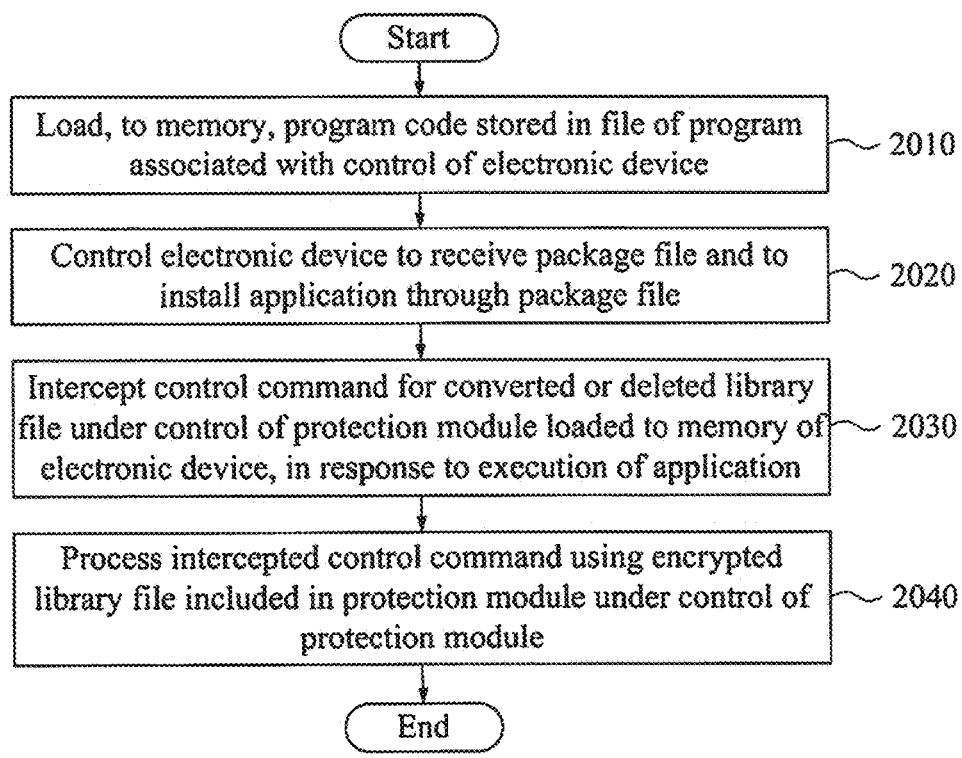
FIG. 20 is a flowchart illustrating another example of a method performed by an electronic device according to at least one example embodiment.

FIG. 19 is a block diagram illustrating another example of constituent elements included in at least one processor of an electronic device according to at least one example embodiment, and FIG. 20 is a flowchart illustrating another example of a method performed by an electronic device according to at least one example embodiment.

The electronic device 110 may configure a code protection system according to other example embodiments. Referring to FIG. 19, the processor 212 of the electronic device 110 may include an application installation controller 1910, a control command interceptor 1920, and/or a control command processor 1930. The processor 212 and the constituent elements of the processor 212 may control the electronic device 110 to perform operations 2010 through 2040 included in the code protection method of FIG. 20. Here, the processor 212 and the constituent elements of the processor 212 may be configured to execute instructions according to a code of at least one program and a code of an OS included in the memory 211. Here, the constituent elements of the processor 212 may be representations of different functions of the processor 212 performed at the processor 212 in response to a control command provided from a program code stored in the electronic device 110, but is not limited thereto. For example, the application installation controller 1910 may be used as a functional representation of the processor 212 that controls the electronic device 110 to install an application in response to the control command.

In operation 2010, the processor 212 may load, to the memory 211, program code stored in a file of a program associated with control of the electronic device 110. For example, the processor 212 may control the electronic device 110 to load the program code from the file of the program to the memory 211. For example, the file of the program may include at least a portion of codes for controlling the processor 212 to perform operations 2020 through 2040, but is not limited thereto.

In operation 2020, the application installation controller 1910 may control the electronic device 110 to receive a package file and to install the application through the package file. Here, as described above, the package file may be at least one file in which at least one library file included in the package file is converted, replaced, and/or deleted at the server 150 and a protection module that includes an encrypted library file is included.

In operation 2030, the control command interceptor 1920 may intercept a control command for the converted, replaced, and/or deleted library file under control of the protection module loaded to the memory 211 of the electronic device 110, in response to execution of the application. For example, the control command interceptor 1920 may generate a detour linker in response to an open command for the protection module loaded to the memory 211 of the electronic device 110, and may intercept the control command for the converted, replaced, and/or deleted library file under control of the generated detour linker. That is, the detour linker may be another functional representation of the control command interceptor 1920 as a module configured to control the electronic device 110 to monitor the control command for the converted, replaced, and/or deleted library file and to intercept the monitored control command.

In operation 2040, the control command processor 1930 may process the intercepted control command using the encrypted library file included in the protection module under control of the protection module. For example, the control command for the converted, replaced, and/or deleted library file may include an open command for the library file. In this case, in operation 2040, the control command processor 1930 may decrypt the encrypted library file in response to the intercepted open command under control of the protection module and may generate and return a fake handle parameter with instructions directed to a buffer that stores the content of the decrypted library file. For example, the fake handle parameter may have a maximum integer variable, or other desired variable (e.g., a special constant value that indicates a special instruction), and, if the maximum integer variable or other desired variable is returned as the fake handle parameter, the protection module may control the protection module processor 1930 to access the buffer that stores the content of the decrypted library file and to process the control command for the library file.

Access to the buffer that stores the content of the library file may be allowed using the fake handle parameter. For example, the control command for the converted, replaced, and/or deleted library file may further include at least one command of an open command, a write command, a read command, and a discover command, etc., for the library file. In this case, in operation 2040, the control command processor 1930 may access the buffer that stores the content of the decrypted library file and may process at least one command based on the fake handle parameter, in response to the intercepted at least one command under control of the protection module. For example, in operation 2040, the control command processor 1930 may copy and return content corresponding to the read command from and to the buffer in response to the read command, may write content corresponding to the write command to the buffer in response to the write command, or may return a location of a file pointer corresponding to the discover command to the buffer in response to the discover command, under the control of the protection module. Accordingly, the electronic device 110 may process the control command for the library file through the buffer, instead of using the original library file.

Figure 21:
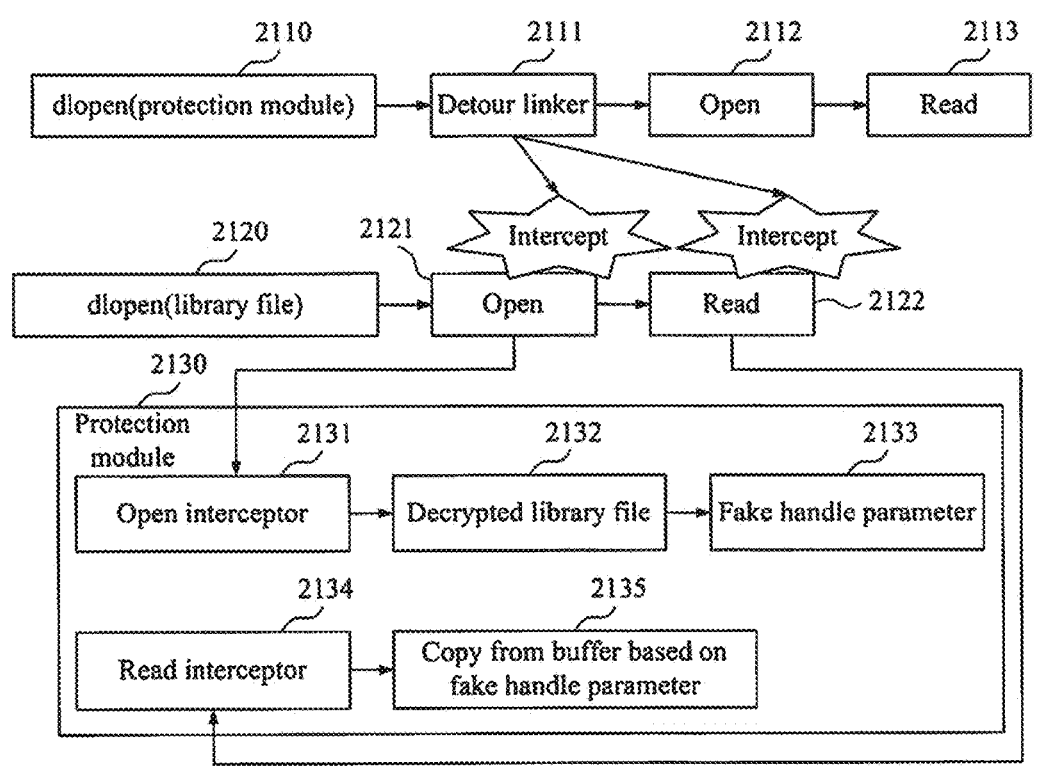
FIG. 21 is a diagram illustrating an example of a process of processing a control command according to at least one example embodiment.

FIG. 21 is a diagram illustrating another example of a method performed at an electronic device according to at least one example embodiment. FIG. 21 illustrates an open command function for a protection module, for example, "dlopen (protection module)" 2110. In response to an open command for the protection module, the control command interceptor 1920 may generate a detour linker 2111 and may process an open command 2112 and/or a read command 2113 for the protection module.

Meanwhile, FIG. 21 illustrates an open command function for a library file, for example, "dlopen (library file)" 2120. Here, an open command 2121 and a read command 2122 for the library file may be monitored and intercepted using the detour linker 2111. If the open command 2121 or the read command 2122 for the library file is required before the protection module is open, it indicates that the library file is deleted, replaced, and/or transformed. Thus, the control command may not be normally processed and it may not be possible to make an unauthorized detour around the protection module.

An open interceptor module 2131 included in a protection module 2130 loaded to a memory may decrypt an encrypted library file in response to the intercepted open command 2121, may manage a decrypted library file 2132 in a buffer, and may generate a fake handle parameter 2133. The fake handle parameter 2133 may provide instructions to a buffer that stores the content of the decrypted library file so that the protection module 2130 may access the library file in response to the control command.

A read interceptor module 2134 may copy 2135 and return the content of the library file corresponding to the read command 2122 from and to the buffer based on the fake handle parameter 2133 in response to the intercepted read command 2122.

Decryption the encrypted library file and/or access to the content of the library file may be performed by the protection module 2130 on the memory, for example, the memory 211 of the electronic device 110. Thus, it is possible to remove and/or make a detour around the protection module using an authorized operation.

According to some example embodiments, it is possible to reduce access to and/or prevent users from directly accessing a library file by converting, replacing, and/or deleting the library file in a package file, and to allow the users to access the encrypted library file through a protection module by adding the protection module that includes the encrypted library file to the package file. Additionally, at least some example embodiments thereby reduce and/or prevent file forgery by removing, replacing, and/or making a detour around the protection module.

The units described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions (e.g., computer readable instructions) to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A code protection method, the method comprising:
storing, using at least one processor, a package file that includes a plurality of files of an application on a storage device;
transforming, using the at least one processor, execution code of a protection target method or function selected from at least one file of the plurality of files that includes the execution code to an unknown instruction;
regenerating, using the at least one processor, the package file by adding to the package file a first protection module file for restoring the transformed protection target method or function; and
transmitting, using the at least one processor, the regenerated package file over a network to an electronic device,
wherein the transforming of the protection target method or function comprises:
selecting the protection target method or function from the selected file that includes the execution code;
cloning the selected protection target method or function;
adding the cloned protection target method or function to the first protection module file;
transforming code included in the selected protection target method or function into execution code associated with the unknown instruction;

adding, to the execution code of the protection target method or function, discovery code for discovering the cloned protection target method or function in the first protection module file;

encrypting at least one instruction of the cloned protection target method or function of the first protection module file using a first encryption key or a first encryption algorithm; and adding decryption code for decrypting the encrypted instruction to the cloned protection target method or function of the first protection module file.

2. The method of claim 1, wherein the selecting the protection target method or function from the selected file comprises: selecting a method or a function of a desired method or function from all of the methods or functions of the execution code as the protection target method or function, or selecting a method or a function corresponding to input information as the protection target method or function.

3. The method of claim 1, wherein the transforming of the code comprises transforming an instruction of the code into an instruction that jumps to a random memory address.

4. The method of claim 1, wherein the adding of the discovery code comprises:

adding a first code for calling a gateway to the selected protection target method or function; and adding a second code for acquiring a memory address of the cloned protection target method or function of the first protection module to the execution code of the gateway.

5. The method of claim 4, wherein the memory address is calculated based on the second code by using a program counter of the electronic device on which the application is installed and executed and a relative address value provided from the first protection module file.

6. The method of claim 1, wherein the first protection module file includes a re-encryption function for re-encrypting the instruction using a second encryption key or a second encryption algorithm based on a desired condition associated with execution of the application on the electronic device and decryption of the encrypted instruction of the cloned protection target method or function of the first protection module file using the decryption code.

7. The method of claim 1, further comprising: encrypting a selected library file from the plurality of files of the application using an encryption key; deleting the library file from the package file; and adding the encrypted library file to a second protection module file, and the second protection module file includes a module configured to intercept a control command for the deleted library file at the electronic device on which the application is installed using the package file and to process the intercepted control command using the encrypted library file included in the second protection module file.

8. The method of claim 7, wherein, when the application is executed on the electronic device, a detour linker is generated in response to an open command for the second protection module file that is loaded to a memory of the electronic device, and the control command for the library file is intercepted by the detour linker.

9. The method of claim 7, wherein the control command for the deleted library file includes an open command for the deleted library file; and the second protection module file is configured to decrypt the encrypted library file in response to the intercepted open command and to generate and return a fake handle parameter providing instructions to a buffer that stores content of the decrypted library file.

10. The method of claim 9, wherein the control command for the deleted library file further includes at least one command of the open command, a write command, and a discover command for the library file; and the second protection module file is configured to process the at least one command by connecting to the buffer that stores the content of the decrypted library file based on the fake handle parameter in response to the intercepted at least one command.

11. The method of claim 10, wherein the second protection module file is configured to: copy and return content corresponding to the read command from and to the buffer in response to the read command; write content corresponding to the write command to the buffer in response to the write command; or return a location of a file pointer corresponding to the discover command to the buffer in response to the discover command.

12. A non-transitory computer-readable medium storing computer readable instructions, which when executed by at least one processor, causes the at least one processor to execute a code protection method, wherein the code protection method comprises:

storing a package file that includes a plurality of files of an application on a storage device, the package file including, a first protection module file for restoring a transformed protection target method or function associated with the application;

restoring the transformed protection target method or function using the first protection module file in response to execution of the application, the restoring including generating execution code based on the transformed protection target method or function and the package file; and executing the generated execution code using the first protection module file, the method further comprising:

cloning the protection target method or function;

adding the cloned protection target method or function to the first protection module file;

adding discovery code to the generated execution code, the discovery code including instructions for discovering the cloned protection target method or function in the first protection module file;

the executing of the generated execution code using the first protection module file comprises executing the generated execution code by discovering the cloned protection target method or function from the first protection module file using the discovery code with respect to the selected protection target method or function;

encrypting at least one instruction of the cloned protection target method or function of the first protection module file using a first encryption key or a first encryption algorithm; and adding decryption code for decrypting the encrypted instruction to the cloned protection target method or function of the first protection module file.

13. The non-transitory computer-readable medium of claim 12, wherein at least one instruction of code included in the protection target method or function is transformed into an unknown instruction or an instruction that jumps to a random memory address.

14. The non-transitory computer-readable medium of claim 12, the method further comprising: encrypting a library file associated with the application using an encryption key; adding the encrypted library file to a second protection module file; and processing of a control command for the library file using the second protection module file, the processing including, loading a protection module included in the second protection module file to a memory of the electronic device in response to execution of the application, intercepting the control command for the library file using the loaded protection module, and processing the intercepted control command using the encrypted library file added to the second protection module file using the loaded protection module.

15. A code protection method of an electronic device, the method comprising:

storing, using at least one processor of the electronic device, a package file that includes a plurality of files of an application on a storage device of the electronic device, the package file including, a first protection module file for restoring a transformed protection target method or function associated with the application;

restoring, using the at least one processor, the transformed protection target method or function using the first protection module file in response to execution of the application, the restoring including generating execution code based on the transformed protection target method or function and the package file; and executing, using the at least one processor, the generated execution code, the method further comprising:

cloning, using the at least one processor, the protection target method or function;

adding, using the at least one processor, the cloned protection target method or function to the first protection module file;

adding, using the at least one processor, discovery code to the generated execution code, the discovery code including instructions for discovering the cloned protection target method or function in the first protection module file;

the executing of the generated execution code using the first protection module file comprises executing the generated execution code by discovering the cloned protection target method or function from the first protection module file using the discovery code with respect to the selected protection target method or function;

encrypting at least one instruction of the cloned protection target method or function of the first protection module file using a first encryption key or a first encryption algorithm; and adding decryption code for decrypting the encrypted instruction to the cloned protection target method or function of the first protection module file.

16. The method of claim 15, the method further comprising: encrypting, using the at least one processor, a library file associated with the application using an encryption key; adding, using the at least one processor, the encrypted library file to a second protection module file; and processing, using the at least one processor, a control command using the second protection module file, the processing of the control command including, loading a protection module included in the second protection module file to a memory of the electronic device in response to the execution of the application, intercepting the control command for the library file using the loaded protection module; and processing the intercepted control command using the encrypted library file added to the second protection module file using the loaded protection module.

* * * * *